United States Patent
Maruyama et al.

(10) Patent No.: US 11,227,422 B2
(45) Date of Patent: Jan. 18, 2022

(54) GRAPH CONVERSION DEVICE, GRAPH CONVERSION METHOD, AND GRAPH CONVERSION PROGRAM

(71) Applicant: NEC Corporation, Tokyo (JP)

(72) Inventors: Takashi Maruyama, Tokyo (JP); Takayuki Kuroda, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/072,442

(22) Filed: Oct. 16, 2020

(65) Prior Publication Data
US 2021/0118210 A1    Apr. 22, 2021

(30) Foreign Application Priority Data
Oct. 17, 2019 (JP) .............................. JP2019-190080

(51) Int. Cl.
*G06T 11/20* (2006.01)
*G06N 3/08* (2006.01)
*G06N 3/04* (2006.01)

(52) U.S. Cl.
CPC .............. *G06T 11/206* (2013.01); *G06N 3/04* (2013.01); *G06N 3/08* (2013.01)

(58) Field of Classification Search
CPC .................................................... G06T 11/206
See application file for complete search history.

(56) References Cited

FOREIGN PATENT DOCUMENTS

| JP | H06-195384 A | 7/1994 |
|----|--------------|--------|
| JP | 2013-161454 A | 8/2013 |

OTHER PUBLICATIONS

T. N. Kipf, M. Welling, "Semi-Supervised Classification With Graph Convolutional Networks," In Proceedings of the International Conference on Learning Representations (ICLR), 2017.
Yueliang Liu, Kangyong You, Guo Wenbin, Tao Peng and Wenbo Wang, "Graph Learning for Spatiotemporal Dynamic Signal," IEEE International Conference on Communications, 2019.
Takayuki Kuroda, Takuya Kuwahara, Takashi Maruyama, Yoichi Sato, "Search-Based Network Design Generation Scheme for Closed-Loop Automation of Network Operations," IEICE Technical Report, vol. 118, No. 118, ICM Nov. 2018, pp. 1-6, Jul. 2018.
Jingwei Zheng and Dagang Li, "GCN-TC: Combining Trace Graph with Statistical Features for Network Traffic Classification," IEEE International Conference on Communications, 2019.

*Primary Examiner* — Jeffery A Brier
(74) *Attorney, Agent, or Firm* — Sughrue Mion, PLLC

(57) ABSTRACT

There are provided an attribute name conversion unit which converts an attribute name of an attribute of each of a vertex and a side constituting a first graph with an attribute into a side constituting a second graph with an attribute and an attribute of the side, the attribute being composed of a first predetermined number of types of elements arranged in a first predetermined order; an attribute value conversion unit which converts an attribute value of an attribute of each of a vertex and a side constituting the first graph with an attribute into a vertex constituting the second graph with an attribute and an attribute of the vertex, the attribute being composed of a second predetermined number of types of elements arranged in a second predetermined order; and a graph-with-attribute generation unit which generates the second graph with an attribute.

20 Claims, 17 Drawing Sheets

FIG. 7

ATTRIBUTE VALUE CATEGORY SET

"object"

"string"

"integer"

"boolean"

FIG. 8

ALLOCATION RULE

FOR ATTRIBUTE NAME A:

FIRST CONDITIONAL EXPRESSION "A HAS FORMAT OF string, AND MATCHES "object" AS CHARACTER STRING":

IF DETERMINED TO BE TRUE, (1, None, None, None) IS RETURNED
   IF DETERMINED TO BE FALSE, (0, A, None, None) IS RETURNED SECOND CONDITIONAL EXPRESSION "A HAS A FORMAT OF integer":

IF DETERMINED TO BE TRUE, (0, None, A, None) IS RETURNED

THIRD CONDITIONAL EXPRESSION "A HAS A FORMAT OF boolean":

IF DETERMINED TO BE TRUE, (0, None, None, A) IS RETURNED

GRAPH CONVERSION DEVICE, GRAPH CONVERSION METHOD, AND GRAPH CONVERSION PROGRAM

This application is based upon and claims the benefit of priority from Japanese patent application No. 2019-190080, filed on Oct. 17, 2019, the disclosure of which is incorporated here in its entirety by reference.

BACKGROUND

Technical Field

The present invention relates to a graph conversion device, a graph conversion method, and a graph conversion program, and particularly to a graph conversion device, a graph conversion method, and a graph conversion program that convert a graph with an indefinite attribute input to a graph neural network.

Related Art

A graph in the specification represents a combination (V, E, f) composed of a set V, a set E, and a map f: E→B×V for a direct product set V×V from E to V, which is called graph topology. The set V is composed of elements called vertices. The set E is composed of elements called sides. In the case where the following proposition holds for f(E), which is an image of graph topology f, the graph of f(E) is called an undirected graph. Graphs other than the undirected graph are called directed graphs.

$$\forall (v1,v2) \in f(E) \rightarrow (v2,v1) \in f(E)".$$

The above-described vertices correspond to "nodes" in a graph theory. The above-described sides correspond to "edges" in the graph theory. The "graph" in the specification hereinafter includes both of the undirected graph and the directed graph.

A vertex v1 and a vertex v2 are called end points of a side e. The vertex v1 and the vertex v2 constitute an image f(e)=(v1, v2) of the side e belonging to a domain E of the graph topology f. In the case of the directed graph, the vertex v1 is called a starting point of the side e, and the vertex v2 is called an end point of the side e.

The graph with an attribute means a graph including at least one of a map g: V→$X_V$ from V to a set $X_V$ and a map h: E→$X_E$ from E to a set $X_E$ among graphs (V, E, f). In the graph with an attribute, the map g and the map h are called a vertex attribute and a side attribute, respectively.

An image g(v) based on a vertex attribute g of a vertex v is called an attribute value of the vertex v. An image h(e) based on a side attribute h of the side e is called an attribute value of the side e.

Each of the attribute values of a vertex and a side of a graph with an indefinite attribute in the specification is expressed by a scalar value having a format, such as Boolean, Integer, Float, and String, which can be expressed by, for example, a computer program. Each attribute value may be represented by data, in which a scalar value is stored in a format such as list, dictionary, and tuple, a combination of, for example, a scalar value and direct product of data, or a nest.

The graph neural network is different from a neural network often used for images. The graph neural network is a graph-specific neural network. The graph neural network is mainly applied to a graph with an attribute. For example, graphs with an attribute expressing a communication network, citation networks, and knowledge graphs are typical examples of a target to which the graph neural network is applied. The graphs with an attribute, citation networks, and knowledge graphs are described in T. N. Kipf and M. Welling, "SEMI-SUPERVISED CLASSIFICATION WITH GRAPH CONVOLUTIONAL NETWORKS," In Proceedings of the International Conference on Learning Representations, 2017, Yueliang Liu, Kangyong You, Guo Wenbin, Tao Peng and Wenbo Wang, "Graph Learning for Spatiotemporal Dynamic Signal," IEEE International Conference on Communications, 2019, and Jingwei Zheng and Dagang Li, "GCN-TC: Combining Trace Graph with Statistical Features for Network Traffic Classification," IEEE International Conference on Communications, 2019.

For example, a graph convolutional neural network is defined in T. N. Kipf and M. Welling, "SEMI-SUPERVISED CLASSIFICATION WITH GRAPH CONVOLUTIONAL NETWORKS," In Proceedings of the International Conference on Learning Representations, 2017. Technology for improving the performance of a classification task, such as a citation network and a knowledge graph, is described in T. N. Kipf and M. Welling, "SEMI-SUPERVISED CLASSIFICATION WITH GRAPH CONVOLUTIONAL NETWORKS," In Proceedings of the International Conference on Learning Representations, 2017.

Technology for improving a prediction task method and a classification task method by expressing a sensor communication network that changes with time in a graph model and using the graph neural network is described in Yueliang Liu, Kangyong You, Guo Wenbin, Tao Peng and Wenbo Wang, "Graph Learning for Spatiotemporal Dynamic Signal," IEEE International Conference on Communications, 2019.

A scheme of applying the graph neural network so that traffic is classified by using graph topology information of a communication network and an attribute value of communication equipment representing a vertex of a graph is described in Jingwei Zheng and Dagang Li, "GCN-TC: Combining Trace Graph with Statistical Features for Network Traffic Classification," IEEE International Conference on Communications, 2019.

A basic scheme for automation of design of network configuration and a knowledge model required for automation are described in Takayuki Kuroda, Takuya Kuwahara, Takashi Maruyama, Yoichi Sato, "SEARCH-BASED NETWORK DESIGN GENERATION SCHEME FOR CLOSED-LOOP AUTOMATION OF NETWORK OPERATIONS," IEICE Technical Report, vol. 118, no. 118, ICM 2018-11, pp. 1-6, July 2018.

A database search scheme is described in Japanese Patent Application Laid-Open No. 1994(Hei 06)-195384. In the scheme, the logical relation between parallel conditions is estimated by using a target database schema together with syntax information. A command close to the intention of a searcher is generated.

A graph information display device capable of easily customizing, for example, a display library, at the time when an application developer develops a user interface is described Japanese Patent Application Laid-Open No. 2013-161454.

Graphs with an attribute are described in T. N. Kipf and M. Welling, "SEMI-SUPERVISED CLASSIFICATION WITH GRAPH CONVOLUTIONAL NETWORKS," In Proceedings of the International Conference on Learning Representations, 2017, Yueliang Liu, Kangyong You, Guo Wenbin, Tao Peng and Wenbo Wang, "Graph Learning for Spatiotemporal Dynamic Signal," IEEE International Conference on Communications, 2019, and Jingwei Zheng and Dagang Li, "GCN-TC: Combining Trace Graph with Statistical Features for Network Traffic Classification," IEEE International Conference on Communications, 2019. The graphs are characterized by the fact that a range set of a vertex attribute g is common to all vertices constituting a graph and the range set of the vertex attribute g does not depend on graph topology.

As shown below, however, there are graphs having difficulty in preliminarily and comprehensively grasping an expected range set. In the graphs, a range set $X_V$ of vertex attributes is different for each vertex, or a range set $X_E$ of a side attribute is different for each side.

The above-described graph is hereinafter called a graph with an indefinite attribute. A fixed range set of a vertex attribute or a fixed range set of a side attribute is not given in the graph with an indefinite attribute, which is one aspect of the graph with an attribute.

"Intent" described in Takayuki Kuroda, Takuya Kuwahara, Takashi Maruyama, Yoichi Sato, "SEARCH-BASED NETWORK DESIGN GENERATION SCHEME FOR CLOSED-LOOP AUTOMATION OF NETWORK OPERATIONS," IEICE Technical Report, vol. 118, no. 118, ICM 2018-11, pp. 1-6, July 2018. is one example of the graph with an indefinite attribute. The intent is information regarding the configuration of an information and communication technology (ICT) system expressed in a graph format.

In general, a new function is frequently added to IT equipment constituting an ICT system, and an existing function is frequently deleted or updated. When a function is changed, the attribute of IT equipment is also changed. The attribute of the IT equipment is characterized by the fact that a person other than a person in charge of changing equipment has difficulty in preliminarily and comprehensively grasping the attribute of the IT equipment due to the frequent change. For the reason of the above-described characteristics, the ICT system is preferably expressed by a graph with an indefinite attribute rather than a graph with an attribute.

FIG. 20 is an explanatory diagram showing one example of a graph with an indefinite attribute. The graph with an indefinite attribute shown in FIG. 20 schematically represents the intent described in Takayuki Kuroda, Takuya Kuwahara, Takashi Maruyama, Yoichi Sato, "SEARCH-BASED NETWORK DESIGN GENERATION SCHEME FOR CLOSED-LOOP AUTOMATION OF NETWORK OPERATIONS," IEICE Technical Report, vol. 118, no. 118, ICM 2018-11, pp. 1-6, July 2018.

The ellipse, in which "AP (abbreviation of application)" is written, shown in FIG. 20 is a vertex representing application software. "App Type (abbreviation of application type)" and "Host VM (abbreviation of host virtual machine)" are written in the balloon attached to the vertex AP. "App Type" and "Host VM" are unique names of each direct product element set constituting the range set of vertex attributes of the vertex AP.

Attribute values "web" and "Linux (registered trademark)" corresponding to each unique name are written in the balloon attached to the vertex AP.

The ellipse, in which "VM (abbreviation of virtual machine)" is written, shown in FIG. 20 is a vertex representing a virtual machine. "CPU cores", "CPU", "Memory", and "OS" are written in the balloon attached to the vertex VM. "CPU cores", "CPU", "Memory", and "OS" are unique names of each direct product element set constituting the range set of vertex attributes of the vertex VM.

Attribute values "6", "4 GHz", "10 GB", and "Linux" corresponding to each unique name are written in the balloon attached to the vertex VM.

"CPU cores" is an abbreviation of central processing unit cores. "CPU" is an abbreviation of a central processing unit. "OS" is an abbreviation of an operating system.

A unique name of each direct product element set constituting the range set of vertex attributes is hereinafter called an attribute name of a vertex attribute. A unique name of each direct product element set constituting the range set of side attributes is hereinafter called an attribute name of a side attribute.

That is, the attribute names of the vertex attributes of the vertex AP representing the application software shown in FIG. 20 are "App Type" and "Host VM". The attribute names of the vertex attributes of the vertex VM representing the virtual machine shown in FIG. 20 are "CPU cores", "CPU", "Memory", and "OS".

As shown in FIG. 20, the attribute set to which the attribute value of the vertex AP representing the application software belongs and the attribute set to which the attribute value of the vertex VM representing the virtual machine belongs are different.

Direct input of a graph with an indefinite attribute to a graph neural network is difficult due to the characteristic of the graph with an indefinite attribute that attribute sets of vertices are different. This is because the attribute value of each vertex constituting a part of input to the graph neural network is required to have a dimension of predetermined number M at the time of being represented by a vector. This is also because the N-th element of each vector is required to be an element of a set in which an attribute name is common to all vertices.

Referring to the example shown in FIG. 20, the attribute value of each vertex of a graph with an indefinite attribute often cannot simultaneously satisfy each of the above-described requirements required for input to the graph neural network. The attribute value of each side of the graph with an indefinite attribute also often cannot simultaneously satisfy each of the above-described requirements for a reason similar to that in the attribute value of each vertex.

In order to input a graph with an indefinite attribute to the graph neural network, the graph with an indefinite attribute is required to be converted into a graph with an attribute. Technology for converting a graph with an indefinite attribute into a graph with an attribute is not described in Japanese Patent Application Laid-Open No. 1994(Hei 06)-195384 and Japanese Patent Application Laid-Open No. 2013-161454.

An object of the invention is to provide a graph conversion device, a graph conversion method, and a graph conversion program capable of converting a graph with an indefinite attribute into a graph with an attribute.

SUMMARY

In an aspect of the present invention, a graph conversion device converts a first graph with an attribute into a second graph with an attribute, and includes: an attribute name conversion unit which converts an attribute name of an attribute of each of a vertex and a side constituting the first graph with an attribute into a side constituting the second graph with an attribute and an attribute of the side, the attribute being composed of a first predetermined number of types of elements arranged in a first predetermined order; an attribute value conversion unit which converts an attribute value of an attribute of each of a vertex and a side constituting the first graph with an attribute into a vertex constituting the second graph with an attribute and an attribute of the vertex, the attribute being composed of a second predetermined number of types of elements arranged in a second predetermined order; and a graph-with-attribute generation unit which generates the second graph with an attribute by combining a converted side and an attribute of the side and a converted vertex and an attribute of the vertex on the basis of graph topology of the first graph with an attribute.

In another aspect of the invention, a graph conversion method is executed in a graph conversion device that converts a first graph with an attribute into a second graph with an attribute, and includes: converting an attribute name of an attribute of each of a vertex and a side constituting the first graph with an attribute into a side constituting the second graph with an attribute and an attribute of the side, the attribute being composed of a first predetermined number of types of elements arranged in a first predetermined order; converting an attribute value of an attribute of each of a vertex and a side constituting the first graph with an attribute into a vertex constituting the second graph with an attribute and an attribute of the vertex, the attribute being composed of a second predetermined number of types of elements arranged in a second predetermined order; and generating the second graph with an attribute by combining a converted side and an attribute of the side and a converted vertex and an attribute of the vertex on the basis of graph topology of the first graph with an attribute.

In another aspect of the invention, a non-transitory computer readable recording medium storing a graph conversion program causes a computer to: convert an attribute name of an attribute of each of a vertex and a side constituting a first graph with an attribute to be converted into a second graph with an attribute into a side constituting the second graph with an attribute and an attribute of the side, the attribute being composed of a first predetermined number of types of elements arranged in a first predetermined order; convert an attribute value of an attribute of each of a vertex and a side constituting the first graph with an attribute into a vertex constituting the second graph with an attribute and an attribute of the vertex, the attribute being composed of a second predetermined number of types of elements arranged in a second predetermined order; and generate the second graph with an attribute by combining a converted side and an attribute of the side and a converted vertex and an attribute of the vertex on the basis of graph topology of the first graph with an attribute.

According to the invention, a graph with an indefinite attribute can be converted into a graph with an attribute.

BRIEF DESCRIPTION OF DRAWINGS

FIG. 7 is an explanatory diagram showing an example of the attribute value category set;

FIG. 8 is an explanatory diagram showing an example of an allocation rule of an attribute value category;

DETAILED DESCRIPTION

Figure 1:
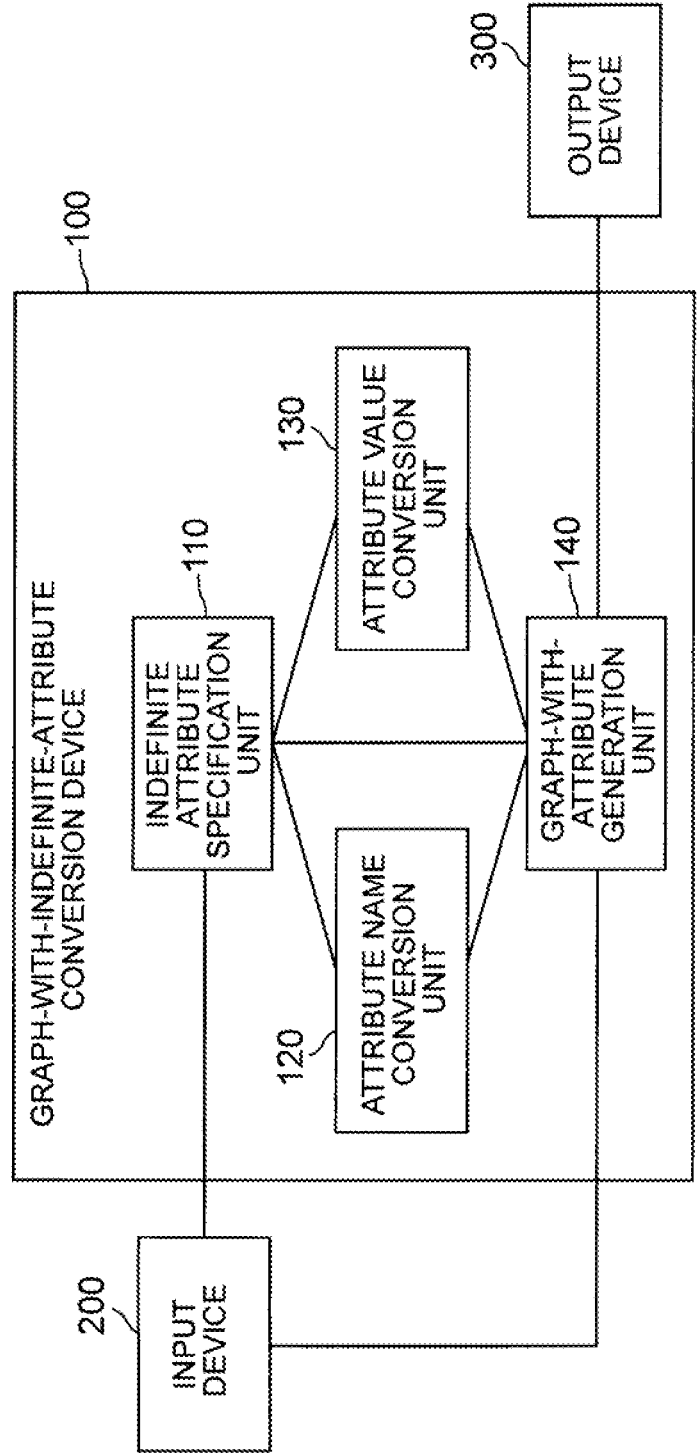
FIG. 1 is a block diagram showing an example of the configuration of a graph-with-indefinite-attribute conversion device of an exemplary embodiment of the invention.

An exemplary embodiment of the invention will be described below with reference to the drawings. FIG. 1 is a block diagram showing an example of the configuration of a graph-with-indefinite-attribute conversion device of the exemplary embodiment of the invention. A graph-with-indefinite-attribute conversion device 100 of the exemplary embodiment shown in FIG. 1 includes an indefinite attribute identification unit 110, an attribute name conversion unit 120, an attribute value conversion unit 130, and a graph-with-attribute generation unit 140.

As shown in FIG. 1, the indefinite attribute identification unit 110 is communicably connected to each of the attribute name conversion unit 120, the attribute value conversion unit 130, and the graph-with-attribute generation unit 140. Each of the attribute name conversion unit 120 and the attribute value conversion unit 130 is communicably connected to the graph-with-attribute generation unit 140. The above-described state of "being communicably connected" includes a wide range of states in which components shown in FIG. 1 can exchange information (data) with each other (the same applies hereinafter).

As shown in FIG. 1, an input device 200 is communicably connected to each of the indefinite attribute identification unit 110 and the graph-with-attribute generation unit 140. An output device 300 is communicably connected to the graph-with-attribute generation unit 140. Functions of each component will be described below with examples.

The indefinite attribute identification unit 110 identifies the attribute of each vertex constituting a graph with an indefinite attribute input from the input device 200. The indefinite attribute identification unit 110 extracts the identified attribute.

The indefinite attribute identification unit 110 converts the extracted attribute of each vertex into a tuple (data structure) composed of predetermined elements. Specifically, the indefinite attribute identification unit 110 converts a combination composed of an attribute name and an attribute value of a component set of a range set of an attribute of each vertex into a tuple in which the attribute name and the attribute value are respectively arranged in the 0th element and the first element.

The indefinite attribute identification unit 110 identifies the subordination between attribute names extracted at respective vertices. The indefinite attribute identification unit 110 extracts the identified subordination in a predetermined format.

As with a side, the indefinite attribute identification unit 110 identifies the attribute of each side constituting a graph with an indefinite attribute input from the input device 200. The indefinite attribute identification unit 110 extracts the identified attribute.

The indefinite attribute identification unit 110 converts the extracted attribute of each side into a tuple composed of predetermined elements. Specifically, the indefinite attribute identification unit 110 converts a combination composed of an attribute name and an attribute value of a component set of a range set of an attribute of each side into a tuple in which the attribute name and the attribute value are respectively arranged in the 0th element and the first element.

The indefinite attribute identification unit 110 identifies the subordination between attribute names extracted at respective sides. The indefinite attribute identification unit 110 extracts the identified subordination in a predetermined format. That is, the indefinite attribute identification unit 110 identifies a predetermined subordination between attribute names of the attributes of a vertex and a side constituting a graph with an indefinite attribute.

A tuple composed of predetermined elements will be hereinafter called a static tuple. Elements constituting the static tuple are called static elements. A tuple composed of an attribute name and an attribute value of a side and a vertex constituting a graph with an indefinite attribute is called a dynamic tuple.

In the extraction process, the indefinite attribute identification unit 110 gives an identifier to each tuple extracted from a vertex and a side. The vertex and the side from which each tuple is extracted can be identified with the identifier. In the extraction process, the indefinite attribute identification unit 110 also gives an identifier to each subordination extracted from a vertex and a side. The vertex and the side from which each subordination is extracted can be identified with the identifier.

The above-described identifier may be any type of identifier as long as a vertex and a side from which a tuple or subordination is extracted can be identified.

Figure 2:
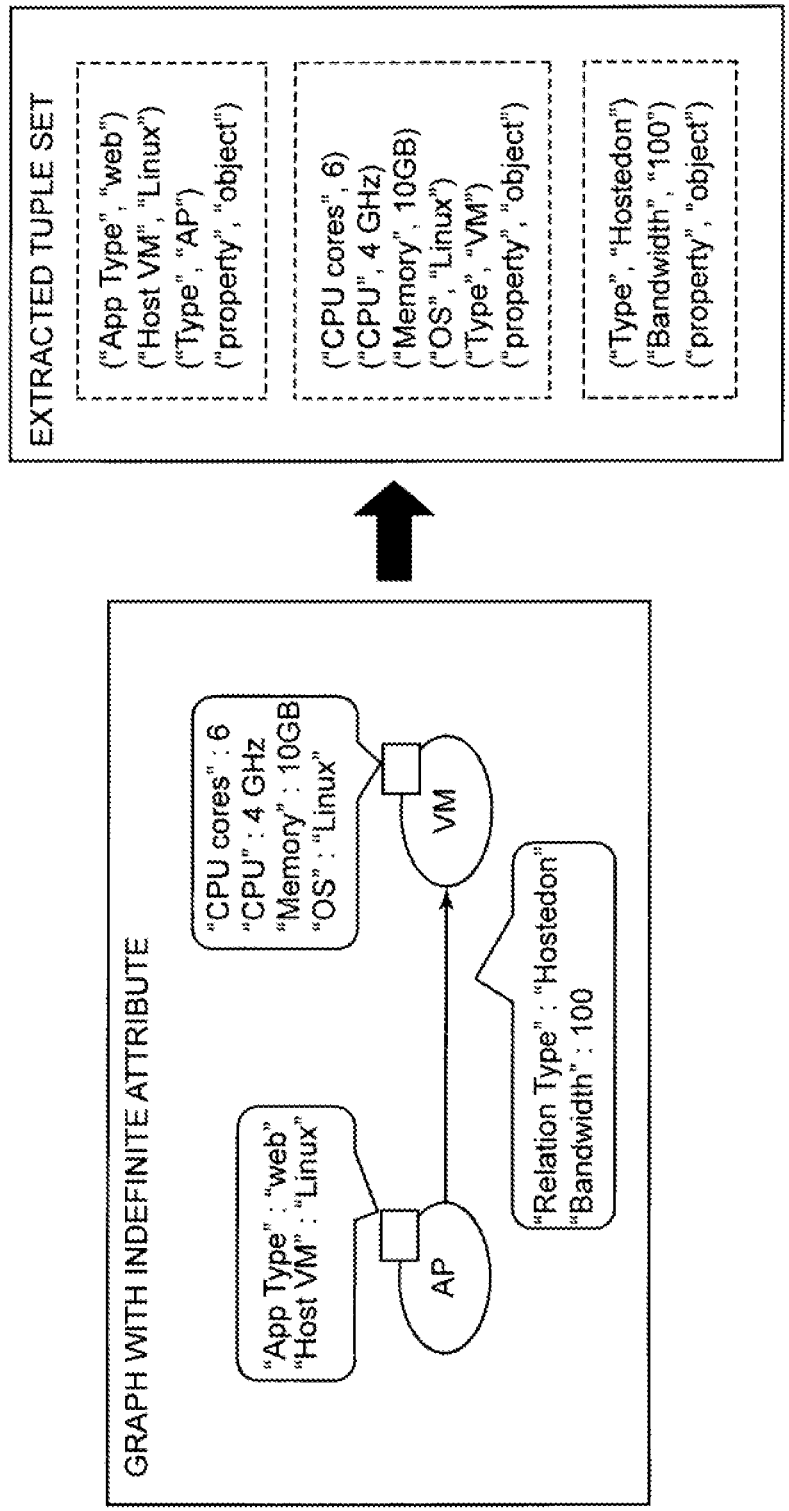
FIG. 2 is an explanatory diagram showing an example of processing of an indefinite attribute identification unit extracting a combination of an attribute name and an attribute value from a graph with an indefinite attribute.

FIG. 2 is an explanatory diagram showing an example of processing of the indefinite attribute identification unit 110 extracting a combination of an attribute name and an attribute value from a graph with an indefinite attribute. FIG. 2 shows processing of extracting a combination of an attribute name and an attribute value of each of a vertex and a side constituting a graph with an indefinite attribute shown in FIG. 20.

In the processing shown in FIG. 2, character strings "property" and "object" are preliminarily defined as static elements constituting a static tuple. In the processing shown in FIG. 2, it is assumed below that "property" and "object" are defined as static elements.

Figure 20:
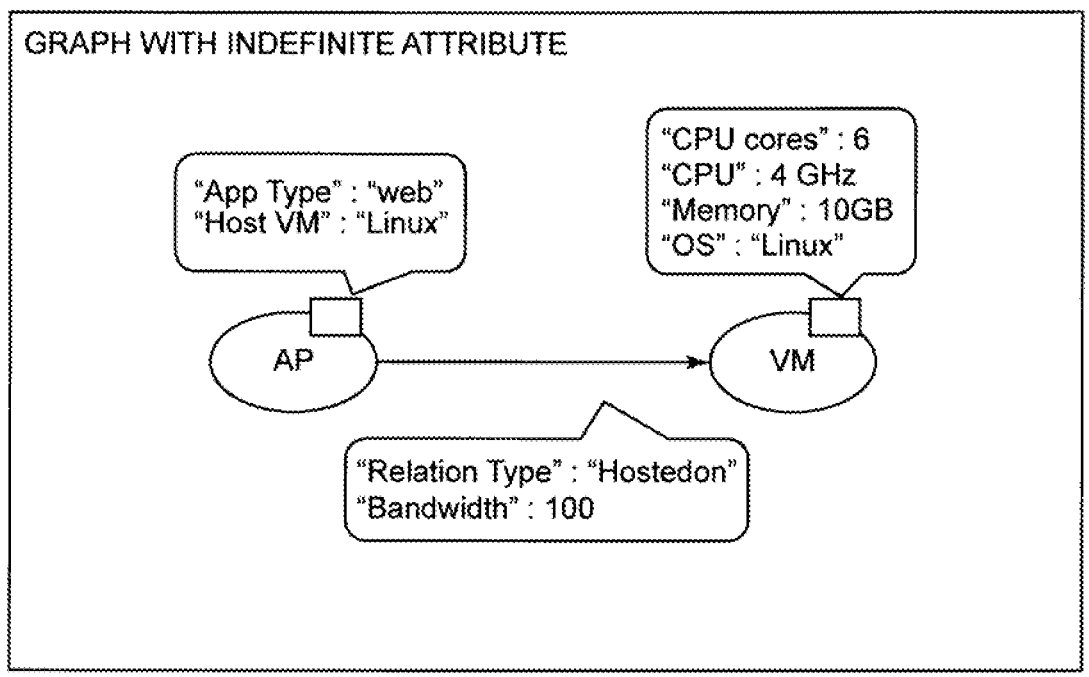
FIG. 20 is an explanatory diagram showing one example of a graph with an indefinite attribute.

The graph with an indefinite attribute shown in FIG. 2 corresponds to the graph with an indefinite attribute shown in FIG. 20. An extracted tuple set shown in FIG. 2 is a set of tuples obtained by extracting a combination composed of an attribute name and an attribute value (hereinafter also called an extracted tuple). The attribute name and the attribute value appear in a range set of attributes of vertices and sides appearing in a graph with an indefinite attribute.

For example, each extracted tuple in the uppermost dashed rectangle of an extracted tuple set corresponds to a combination of an attribute name and an attribute value ("App Type": "web"), ("Host VM": "Linux"), and ("Type": "AP") contained in the attribute of a vertex AP. The indefinite attribute identification unit 110 obtains each extracted tuple by converting each combination into a tuple having an attribute name in the 0th element and an attribute value in the first element.

The indefinite attribute identification unit 110 obtains each extracted tuple in a central dashed rectangle of the extracted tuple set by converting each combination of an attribute name and an attribute value contained in the attribute of a vertex VM in a method similar to that described above. The indefinite attribute identification unit 110 obtains each extracted tuple in the lowermost dashed rectangle of the extracted tuple set by converting each combination of an attribute name and an attribute value contained in the attribute of a side in a method similar to that described above.

The indefinite attribute identification unit 110 may convert each combination of an attribute name and an attribute value into data in a format other than a tuple. As long as an attribute name, an attribute value, or the combination relation between the attribute name and the attribute value before conversion is expressed in a determinable format, the indefinite attribute identification unit 110 may perform conversion in any method, and may perform input in any format.

For example, the indefinite attribute identification unit 110 may store each set of an attribute name and an attribute value in a list format in the order of an attribute name in the 0th element and an attribute value in the first element.

A static element constituting the static tuple shown in FIG. 2 is not limited to "property" and "object". The static element may be written in another format such as another character string and numbers.

An example of the subordination extracted from a vertex constituting an input graph with an indefinite attribute will now be described. When an attribute name A in a tuple identified from a vertex is a superordinate-conceptual attribute name of another attribute name B identified from the same vertex, the subordination of "the attribute name B is subordinated to the attribute name A" is defined.

When the above-described definition is used, no subordination is stipulated between attribute names extracted from different vertices. The criterion for determining whether or not an attribute name is superordinate-conceptual may be a criterion that has already been given or a criterion that is appropriately given. Conceptual relation indicating the relation between a superordinate concept and a subordinate concept is not required to be stipulated between optional two attribute names.

Similarly, an example of the subordination extracted from a side constituting an input graph with an indefinite attribute will be described. When an attribute name C in a tuple identified from a side is a superordinate-conceptual attribute name of another attribute name D identified from the same side, the subordination of "the attribute name D is subordinated to the attribute name C" is defined.

When the above-described definition is used, no subordination is stipulated between attribute names extracted from different sides. The criterion for determining whether or not an attribute name is superordinate-conceptual may be a criterion that has already been given or a criterion that is appropriately given. Conceptual relation is not required to be stipulated between optional two attribute names.

Figure 3:
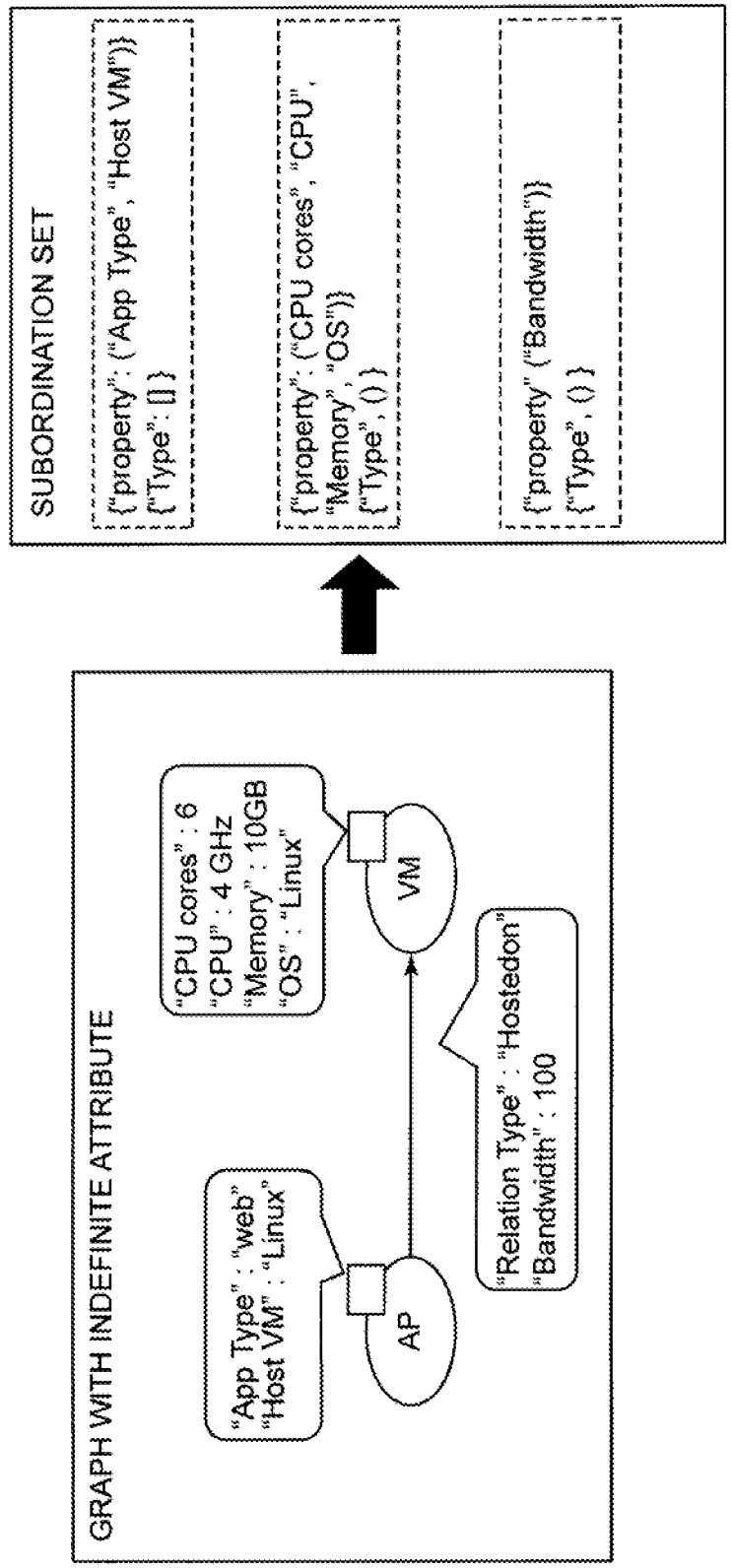
FIG. 3 is an explanatory diagram showing an example of processing of the indefinite attribute identification unit extracting the subordination between attribute names from the graph with an indefinite attribute.

FIG. 3 is an explanatory diagram showing an example of processing of the indefinite attribute identification unit 110 extracting the subordination between attribute names from a graph with an indefinite attribute. FIG. 3 shows processing of extracting the subordination between attribute names from attributes of a vertex and a side constituting a graph with an indefinite attribute.

The rectangle associated with a vertex shown in FIG. 3 represents the property of the vertex. In the graph with an indefinite attribute shown in FIG. 3, the property of the vertex AP is defined as a superordinate-conceptual attribute name of each of the attribute names "App Type" and "Host VM" in a balloon. That is, the attribute of the vertex AP of the graph with an indefinite attribute is included in the property of the vertex AP. A superordinate-conceptual attribute name includes one attribute name in a set.

The indefinite attribute identification unit 110 extracts subordination in accordance with the inclusion relation shown in FIG. 3 and the above-described definition of the subordination. The indefinite attribute identification unit 110 uses, as a key, a character string "property" representing a property defined as a superordinate-conceptual attribute name, and expresses the character string "property" in a dictionary in which a tuple is used as a value. The tuple contains, as an element, each of the attribute names "App Type" and "Host VM" contained in an attribute. Thus, the indefinite attribute identification unit 110 obtains the subordination in an uppermost dashed rectangle.

Similarly, the indefinite attribute identification unit 110 obtains the subordination in a central dashed rectangle by performing processing similar to that described above on the attribute of the vertex VM. The indefinite attribute identification unit 110 also obtains the subordination in a lowermost dashed rectangle by performing processing similar to that described above on the attribute of a side.

Note that the description format of the subordination is not limited to the dictionary format. The subordination may be expressed in any description format as long as the conceptual relation between attribute names is written in a determinable format.

The indefinite attribute identification unit 110 inputs an extracted tuple set to each of the attribute name conversion unit 120, the attribute value conversion unit 130, and the graph-with-attribute generation unit 140. The indefinite attribute identification unit 110 inputs the extracted subordination set to the graph-with-attribute generation unit 140.

The attribute name conversion unit 120 has a function of converting an attribute name stored in the 0th element of the extracted tuple obtained by the indefinite attribute identification unit 110 with reference to an allocation rule of a predefined attribute name category. The attribute name conversion unit 120 converts an attribute name to be converted into a tuple having a materialization value of each predefined attribute name category (one element of a set having each attribute name category as a name) as an element. For example, the attribute name conversion unit 120 converts an attribute name to be converted into a tuple having an attribute name to be converted as a materialization value of an attribute name category to which the attribute name to be converted belongs.

The attribute name category referred to by the attribute name conversion unit 120 represents the name of a set to which an attribute name belongs. The attribute name category is defined separately. The attribute name category set is composed of attribute name categories.

Figure 4:
FIG. 4 is an explanatory diagram showing an example of an attribute name category set.

FIG. 4 is an explanatory diagram showing an example of an attribute name category set. In the example shown in FIG. 4, the set names "Type" and "Kind" to which attribute names belong are defined as attribute name categories. That is, the attribute name category set shown in FIG. 4 is composed of "Type" and "Kind".

The attribute name category is not limited to "Type" and "Kind". The format of an attribute name category is not limited to a character string. The attribute name category may have another format such as a number, a list, and a map.

An attribute name category predefined for an attribute name is uniquely allocated to the attribute name by the allocation rule of an attribute name category referred to by the attribute name conversion unit 120.

Figure 5:
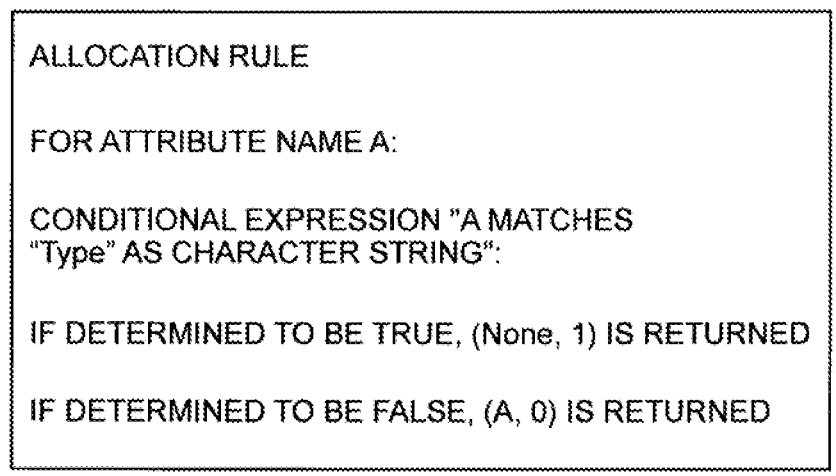
FIG. 5 is an explanatory diagram showing an example of an allocation rule of an attribute name category.

FIG. 5 is an explanatory diagram showing an example of an allocation rule of an attribute name category. The allocation rule shown in FIG. 5 is one example of the allocation rule based on the attribute name category set shown in FIG. 4.

If the attribute name A of the 0th element of an extracted tuple obtained by the indefinite attribute identification unit 110 is determined to be true in a conditional expression "A matches "Type" as a character string", a tuple (None, 1) is returned. If the attribute name A is determined to be false in the conditional expression, a tuple (A, 0) is returned.

The 0th element of a tuple returned in accordance with the allocation rule if the attribute name A is determined to be false is an element of a character string set whose set name is an attribute name "Kind". The first element of a tuple returned in accordance with the allocation rule if the attribute name A is determined to be true is an element of binary set whose set name is an attribute name "Type" and which is composed of integer values of 0 and 1.

That is, an element of a tuple returned in accordance with the allocation rule is composed of a value indicating an attribute name category to which an attribute name identified by the indefinite attribute identification unit 110 brings. An element of the returned tuple may contain the identified attribute name.

The allocation rule shown in FIG. 5 is one example of rules. The conditional expression used for allocation is not limited to the matching of character strings. Any conditional expression may be used as long as one attribute name category is uniquely allocated to one attribute name in the conditional expression.

The element constituting a tuple returned in accordance with the allocation rule is not limited to "None", "1", and "0". The element constituting a tuple may be written in another format such as other character strings and numbers.

Figure 6:
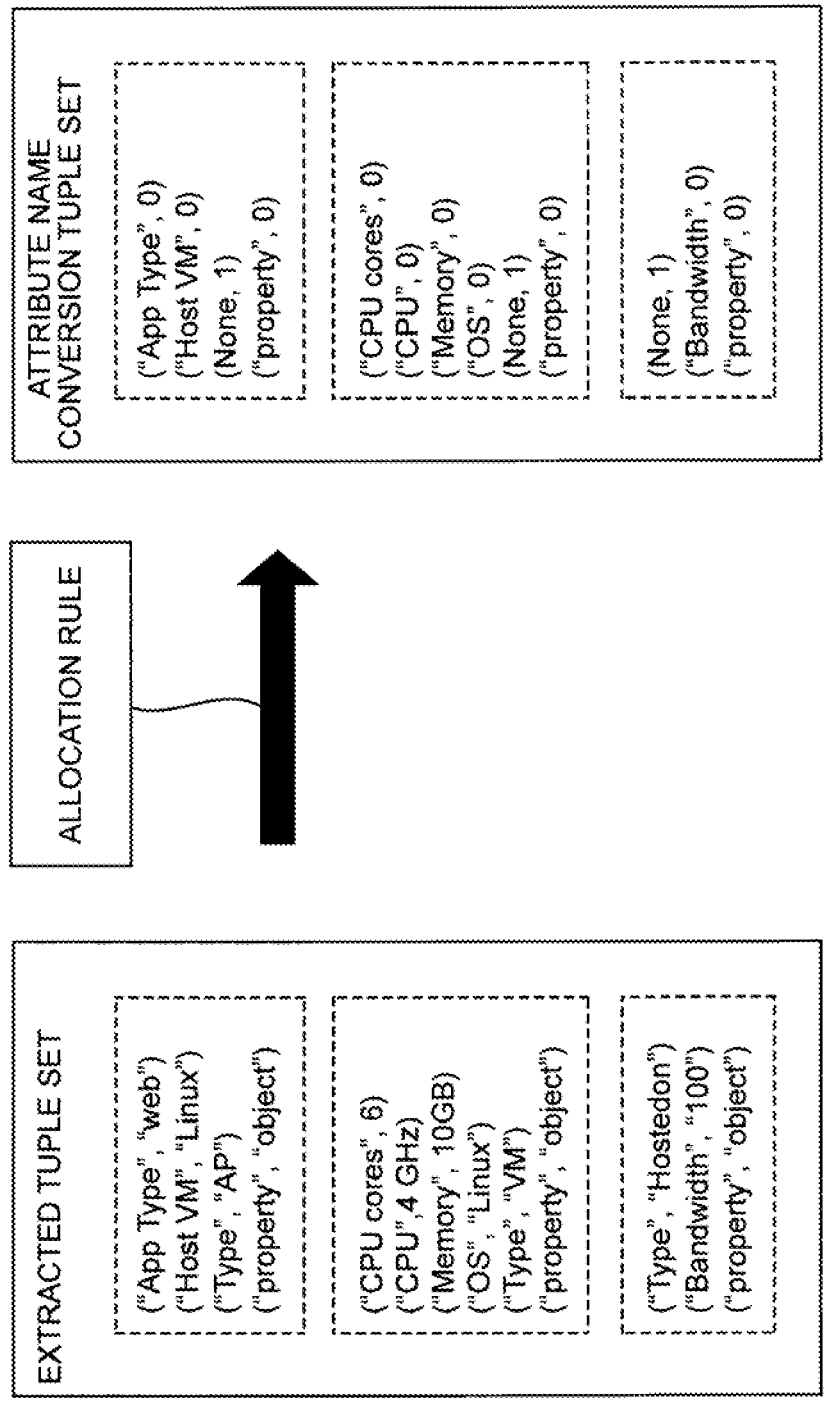
FIG. 6 is an explanatory diagram showing an example of processing of an attribute name conversion unit converting a combination of an attribute name and an attribute value into a tuple in accordance with the allocation rule of an attribute name category.

FIG. 6 is an explanatory diagram showing an example of processing of the attribute name conversion unit 120 converting a combination of an attribute name and an attribute value into a tuple in accordance with an allocation rule of an attribute name category. FIG. 6 shows processing of the attribute name conversion unit 120 converting an extracted tuple set obtained by the indefinite attribute identification unit 110.

The attribute name conversion unit 120 determines the 0th element of each extracted tuple of an extracted tuple set extracted by the indefinite attribute identification unit 110 in accordance with the allocation rule shown in FIG. 5. The attribute name conversion unit 120 generates an attribute name conversion tuple set composed of a materialization value of the attribute name category by the determination.

For example, each attribute name of extracted tuples ("Type", "AP"), ("Type", "VM"), and ("Type", "Hostedon") of the extracted tuple set shown in FIG. 6 satisfies the conditional expression "A matches "Type" as a character string" of the allocation rule shown in FIG. 5. The attribute name conversion unit 120 converts each of attribute names of the extracted tuples into an attribute name conversion tuple (None, 1) composed of a materialization value of the attribute name category.

The attribute name "Type" of ("Type", "AP") is converted into (None, 1) in the uppermost dashed rectangle of the attribute name conversion tuple set shown in FIG. 6. The attribute name "Type" of ("Type", "VM") is converted into (None, 1) in the central dashed rectangle of the attribute name conversion tuple set shown in FIG. 6. The attribute name "Type" of ("Type", "Hostedon") is converted into (None, 1) in the lowermost dashed rectangle of the attribute name conversion tuple set shown in FIG. 6.

An attribute name of an extracted tuple other than the above-described extracted tuple of the extracted tuple set shown in FIG. 6 does not satisfy the conditional expression "A matches "Type" as a character string". The attribute name conversion unit 120 thus converts each of attribute names of the extracted tuples into an attribute name conversion tuple other than (None, 1).

As described above, the attribute name conversion unit 120 uniquely allocates an attribute name category to an identified attribute name with reference to a predefined rule for allocating an attribute name category, and converts the attribute name on the basis of the allocated attribute name category.

The attribute name conversion unit 120 may convert an attribute name of an extracted tuple obtained by the indefinite attribute identification unit 110 into a format other than a tuple. The attribute name conversion unit 120 may perform conversion in any format as long as an attribute name category to which an element constituting a conversion result belongs is expressed in a determinable format.

The attribute name conversion unit 120 inputs an attribute name conversion tuple set composed of a materialization value of the attribute name category obtained by the conversion to the graph-with-attribute generation unit 140.

The attribute value conversion unit 130 has a function of converting an attribute value stored in the first element of the extracted tuple obtained by the indefinite attribute identification unit 110 with reference to an allocation rule of a predefined attribute value category. The attribute value conversion unit 130 converts an attribute value to be converted into a tuple having a materialization value of each predefined attribute value category (one element of a set having each attribute value category as a name) as an element. For example, the attribute value conversion unit 130 converts an attribute value to be converted into a tuple having an attribute value to be converted as a materialization value of an attribute value category to which the attribute value to be converted belongs.

The attribute value category referred to by the attribute value conversion unit 130 represents the name of a set to which an attribute value belongs. The attribute value category is defined separately. The attribute value category set is composed of attribute value categories.

FIG. 7 is an explanatory diagram showing an example of an attribute value category set. In the example shown in FIG. 7, the set names "object", "string", "integer", and "boolean" to which attribute values belong are defined as attribute value categories. That is, the attribute value category set shown in FIG. 7 is composed of "object", "string", "integer", and "boolean".

The attribute value category is not limited to "object", "string", "integer", and "boolean". The format of an attribute value category is not limited to a character string. The attribute value category may have another format such as a number, a list, and a map.

An attribute value category predefined for an attribute value is uniquely allocated to the attribute value by the allocation rule of an attribute value category referred to by the attribute value conversion unit 130.

FIG. 8 is an explanatory diagram showing an example of an allocation rule of an attribute value category. The allocation rule shown in FIG. 8 is one example of the allocation rule based on the attribute value category set shown in FIG. 7.

If the attribute value A of the first element of an extracted tuple obtained by the indefinite attribute identification unit 110 is determined to be true in a first conditional expression "A has a format of string, and matches "object" as a character string", a tuple (1, None, None, None) is returned. If the attribute value A is determined to be false in the first conditional expression, a tuple (0, A, None, None) is returned.

If the attribute value A is determined to be true in a second conditional expression "A has a format of integer", a tuple (0, None, A, None) is returned. If the attribute value A is determined to be true in a third conditional expression "A has a format of boolean", a tuple (0, None, None, A) is returned.

That is, an element of a tuple returned in accordance with the allocation rule is composed of a value indicating an attribute value category to which an attribute value identified by the indefinite attribute identification unit 110 brings. An element of the returned tuple may contain the identified attribute value.

The allocation rule shown in FIG. 8 is one example of rules. The conditional expression used for allocation is not limited to the matching of character strings and formats. Any conditional expression may be used as long as one attribute value category is uniquely allocated to one attribute value in the conditional expression.

The element constituting a tuple returned in accordance with the allocation rule is not limited to "None", "1", and "0". The element constituting a tuple may be written in another format such as other character strings and numbers.

Figure 9:
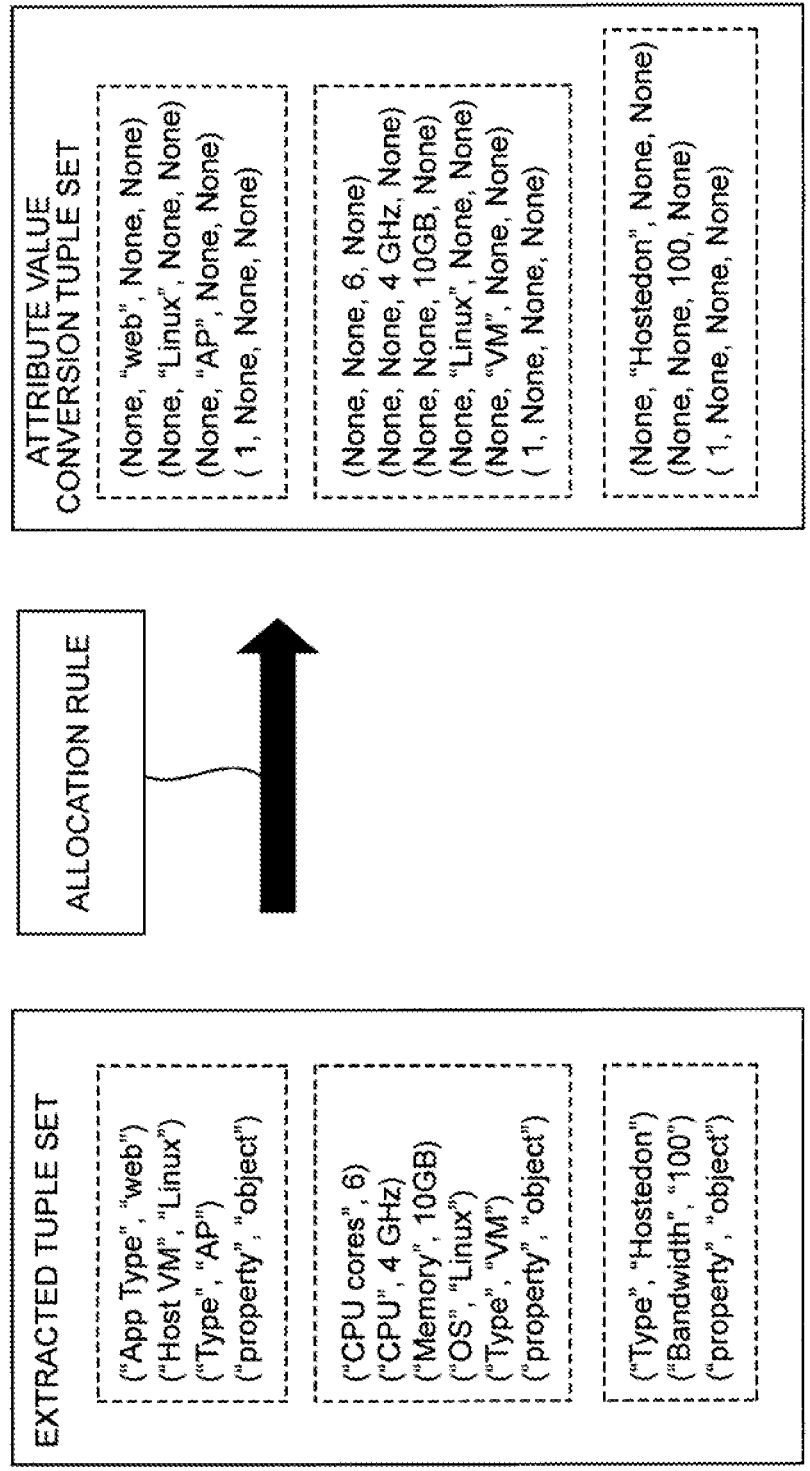
FIG. 9 is an explanatory diagram showing an example of processing of an attribute value conversion unit converting a combination of an attribute name and an attribute value into a tuple in accordance with the allocation rule of an attribute value category.

FIG. 9 is an explanatory diagram showing an example of processing of the attribute value conversion unit 130 converting a combination of an attribute name and an attribute value into a tuple in accordance with an allocation rule of an attribute value category. FIG. 9 shows processing of the attribute value conversion unit 130 converting an extracted tuple set obtained by the indefinite attribute identification unit 110.

The attribute value conversion unit 130 determines the first element of each extracted tuple of an extracted tuple set extracted by the indefinite attribute identification unit 110 in accordance with the allocation rule shown in FIG. 8. The attribute value conversion unit 130 generates an attribute value conversion tuple set composed of a materialization value of the attribute value category by the determination.

For example, since the extracted tuple ("Type", "AP") of the extracted tuple set shown in FIG. 9 has "AP" in the first element, the first element is determined to be false in the first conditional expression of the allocation rule shown in FIG. 8. The attribute value conversion unit 130 converts the attribute value "AP" into an attribute value conversion tuple (None, "AP", None, None) shown in FIG. 9.

The attribute value conversion unit 130 also converts an attribute value of each extracted tuple other than the above-described extracted tuple into the attribute value conversion tuple composed of materialization values of an attribute value category by applying the allocation rule shown in FIG. 8.

As described above, the attribute value conversion unit 130 uniquely allocates an attribute value category to the identified attribute value with reference to a predefined rule for allocating an attribute value category, and converts the attribute value on the basis of the allocated attribute value category.

The attribute value conversion unit 130 may convert an attribute value of an extracted tuple obtained by the indefinite attribute identification unit 110 into a format other than a tuple.

The attribute value conversion unit 130 may perform conversion in any format as long as an attribute value category to which an element constituting a conversion result belongs is expressed in a determinable format.

The attribute value conversion unit 130 inputs an attribute value conversion tuple set composed of a materialization value of the attribute value category obtained by the conversion to the graph-with-attribute generation unit 140.

The graph-with-attribute generation unit 140 receives the extracted tuple set and the subordination set obtained by the indefinite attribute identification unit 110. The graph-with-attribute generation unit 140 receives an attribute name conversion tuple set composed of a materialization value of the attribute name category obtained by conversion of the attribute name conversion unit 120. The graph-with-attribute generation unit 140 receives an attribute value conversion tuple set composed of a materialization value of the attribute value category obtained by conversion of the attribute value conversion unit 130.

The graph-with-attribute generation unit 140 has a function of generating a graph with an attribute by sequentially performing the following three pieces of processing of Processing (1), Processing (2), and Processing (3).

In each of Processing (1), Processing (2), and Processing (3), a product similar to a graph is transferred. An end point of a side is missing in the product. The transferred product is not the graph initially defined herein. A product (template) similar to a graph is hereinafter called a pseudo graph.

Processing (1): the graph-with-attribute generation unit 140 converts the 0th element of an extracted tuple extracted by the indefinite attribute identification unit 110 into a side, and converts the first element of the extracted tuple into a vertex, which is an end point of the converted side. The graph-with-attribute generation unit 140 generates a pseudo graph by giving the converted vertex to one of end points of the converted side.

The attribute name conversion unit 120 may perform the processing of converting the 0th element of the extracted tuple into a side. The attribute value conversion unit 130 may perform the processing of converting the first element of the extracted tuple into a vertex.

The graph-with-attribute generation unit 140 links the converted side and the converted vertex in accordance with the subordination between attribute names identified by the indefinite attribute identification unit 110.

Processing (2): the graph-with-attribute generation unit 140 gives an attribute value conversion tuple obtained by the attribute value conversion unit 130 as the attribute of a vertex constituting a pseudo graph generated in Processing (1). The graph-with-attribute generation unit 140 gives an attribute name conversion tuple obtained by the attribute name conversion unit 120 as the attribute of a side constituting the generated pseudo graph.

Processing (3): the graph-with-attribute generation unit 140 generates vertices. One of the vertices includes, as an attribute, a tuple representing a side itself which belongs to a domain of graph topology of an input graph with an indefinite attribute. The other of the vertices includes, as an attribute, a tuple representing a vertex itself which belongs to a vertex set of an input graph with an indefinite attribute. The tuple representing the vertex itself is, for example, (1, None, None, None).

The graph-with-attribute generation unit 140 gives a vertex including the generated tuple (1, None, None, None) as an attribute to the pseudo graph to which an attribute is given in Processing (2). The graph-with-attribute generation unit 140 generates a side including a tuple as an attribute. The tuple has a materialization value of an attribute name category as an element.

The graph-with-attribute generation unit 140 generates a side between vertices. One of the vertices includes, as an attribute, a tuple representing a side which belongs to a domain of the graph topology of an input graph with an indefinite attribute. The other of the vertices includes, as an attribute, a tuple representing a vertex that corresponds to a starting point or an end point of a side and belongs to the vertex set of an input graph with an indefinite attribute.

Both of a tuple representing a side and a tuple representing a vertex are (1, None, None, None). A generated side includes, as an attribute, a tuple in which a value indicating an attribute name category is an element.

A side of an input graph with an indefinite attribute or a vertex including a tuple (1, None, None, None) corresponding to a vertex 0 is hereinafter called a representative point of 0. The side and the vertex are generated by the graph-with-attribute generation unit 140.

The graph-with-attribute generation unit 140 gives an identifier to a vertex and a side obtained by being converted from a tuple in the middle of Processing (1). The identifier is used for identifying a tuple of conversion source and a position of an element of the tuple of conversion source.

Figure 10:
FIG. 10 is an explanatory diagram showing an example of processing of a graph-with-attribute generation unit converting a combination of an attribute name and an attribute value into a pseudo graph.

FIG. 10 is an explanatory diagram showing an example of processing of the graph-with-attribute generation unit 140 converting a combination of an attribute name and an attribute value into a pseudo graph. FIG. 10 shows processing of converting the 0th element of one extracted tuple extracted by the indefinite attribute identification unit 110 into a side, and converting the first element of the extracted tuple into a vertex, which is an end point of the converted side, in Processing (1) performed by the graph-with-attribute generation unit 140.

In Processing (1), the graph-with-attribute generation unit 140 converts "App Type" of the 0th element of one extracted tuple shown in FIG. 10 into a side represented by a straight line of the pseudo graph shown in FIG. 10. The graph-with-attribute generation unit 140 converts "web" of the first element of one extracted tuple shown in FIG. 10 into a vertex represented by a circle of the pseudo graph shown in FIG. 10.

The graph-with-attribute generation unit 140 generates a pseudo graph by giving the converted vertex to one of end points of the converted side.

Figure 11:
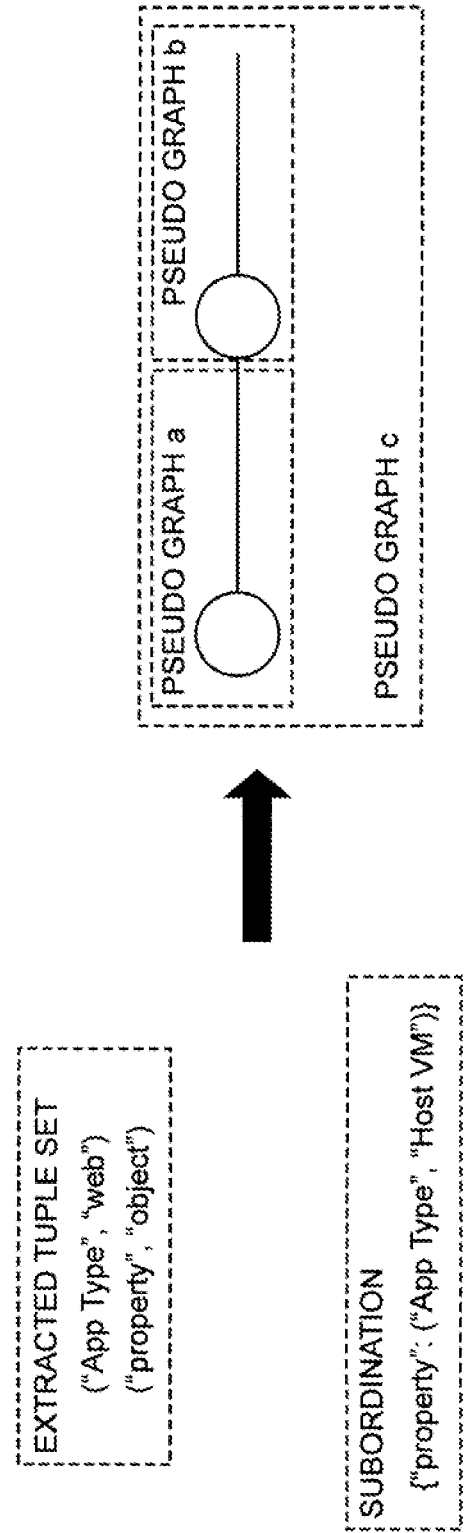
FIG. 11 is an explanatory diagram showing an example of processing of the graph-with-attribute generation unit linking pseudo graphs.

FIG. 11 is an explanatory diagram showing an example of processing of the graph-with-attribute generation unit 140 linking pseudo graphs. FIG. 11 shows a part of processing of the graph-with-attribute generation unit 140 converting the 0th element of an extracted tuple extracted by the indefinite attribute identification unit 110 into a side, and converting the first element of the extracted tuple into a vertex, which is an end point of the converted side.

FIG. 11 shows another part of processing of the graph-with-attribute generation unit 140 linking the converted side and the converted vertex in accordance with the subordination between attribute names extracted by the indefinite attribute identification unit 110.

As shown in FIG. 11, the graph-with-attribute generation unit 140 converts attribute names "App Type" and "property" into a side of a pseudo graph a and a side of a pseudo graph b, respectively. The attribute names "App Type" and "property" constitute two extracted tuples of the extracted tuple set extracted by the indefinite attribute identification unit 110.

As shown in FIG. 11, the graph-with-attribute generation unit 140 converts attribute values "web" and "object" into a vertex of the pseudo graph a and a vertex of the pseudo graph b, respectively. The attribute values "web" and "object" constitute two extracted tuples.

The graph-with-attribute generation unit 140 determines that subordination and two extracted tuples are extracted from the same vertex AP on the basis of one subordination shown in FIG. 11 extracted by the indefinite attribute identification unit 110 and identifiers of two extracted tuples contained in an extracted tuple set.

The graph-with-attribute generation unit 140 links the pseudo graph a and the pseudo graph b on the basis of the fact that the attribute name "property" of the subordination is a key and "App Type" is a value. The pseudo graph a and the pseudo graph b are obtained by converting two extracted tuples extracted from the vertex AP from which the subordination is extracted.

Specifically, as shown in FIG. 11, the graph-with-attribute generation unit 140 obtains a pseudo graph c by linking a remaining end point of a side of the pseudo graph a and an end point (vertex) of a side of the pseudo graph b. The pseudo graph a is obtained by converting "App Type". The pseudo graph b is obtained by converting "property".

In the processing shown in FIG. 11, only two extracted tuples of the extracted tuple set that has been extracted are converted. The graph-with-attribute generation unit 140, however, performs processing similar to linking processing shown in FIG. 11 on a pseudo graph obtained by converting each vertex on the basis of all subordinations extracted from the same vertex.

The graph-with-attribute generation unit 140 uses the pseudo graph obtained by the linkage in Processing (1) in the next Processing (2).

Figure 12:
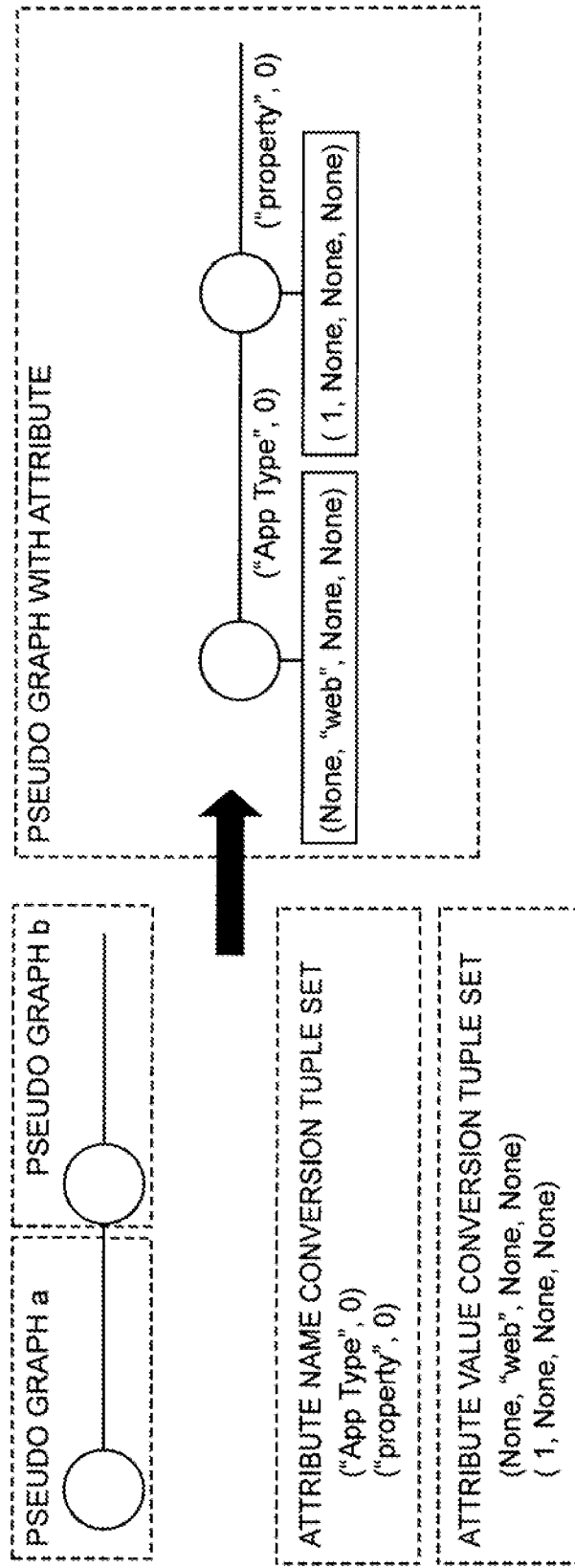
FIG. 12 is an explanatory diagram showing an example of processing of the graph-with-attribute generation unit giving an attribute to a linked pseudo graph.

FIG. 12 is an explanatory diagram showing an example of processing of the graph-with-attribute generation unit 140 giving an attribute to a linked pseudo graph. FIG. 12 shows processing of the graph-with-attribute generation unit 140 giving an attribute value conversion tuple obtained by the attribute value conversion unit 130 to the pseudo graph obtained by the linkage in Processing (1) as the attribute of a vertex.

FIG. 12 shows processing of the graph-with-attribute generation unit 140 giving an attribute name conversion tuple obtained by the attribute name conversion unit 120 to the pseudo graph obtained by the linkage in Processing (1) as the attribute of a side.

The graph-with-attribute generation unit 140 determines an attribute name conversion tuple ("App Type", 0) of an attribute name conversion tuple set obtained by conversion of the attribute name conversion unit 120 to be a tuple obtained by converting "App Type" on the basis of an identifier given to the tuple. As shown in FIG. 12, the graph-with-attribute generation unit 140 gives an attribute name conversion tuple ("App Type", 0) to a side of the pseudo graph a obtained by converting "App Type" as an attribute.

The graph-with-attribute generation unit 140 also gives, as an attribute, a remaining attribute name conversion tuple and an attribute value conversion tuple of an attribute value conversion tuple set obtained by conversion of the attribute value conversion unit 130 to a vertex or a side of a pseudo graph linked in a similar procedure.

The graph-with-attribute generation unit 140 uses a pseudo graph with an attribute as shown in FIG. 12 in the next Processing (3). An attribute is given to the pseudo graph in Processing (2).

Figure 13:
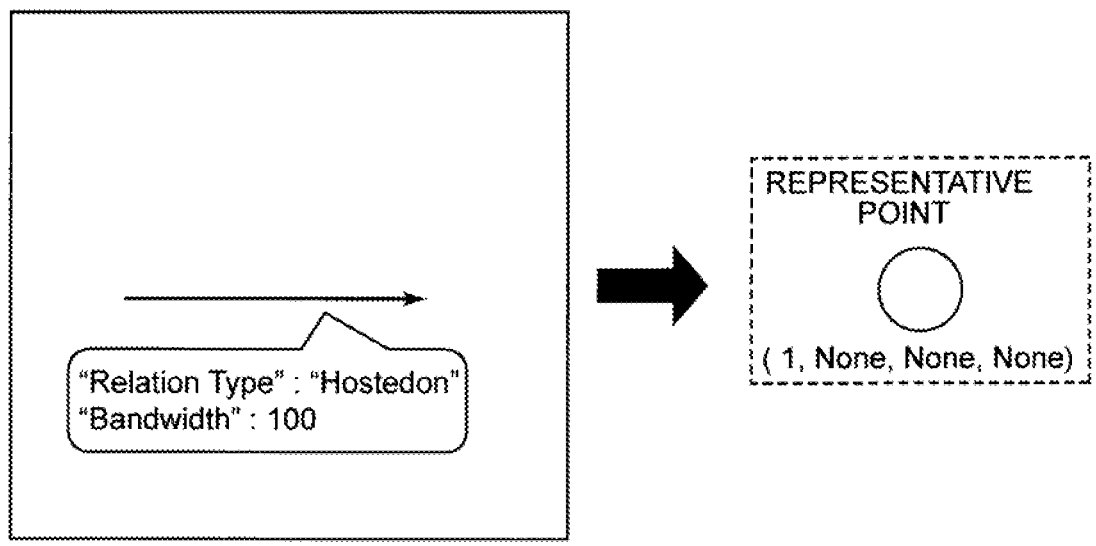
FIG. 13 is an explanatory diagram showing an example of processing of the graph-with-attribute generation unit converting a side constituting a graph with an indefinite attribute into a representative point.

FIG. 13 is an explanatory diagram showing an example of processing of the graph-with-attribute generation unit 140 converting a side constituting a graph with an indefinite attribute into a representative point. FIG. 13 shows processing of generating a vertex (i.e., representative point) including a tuple (1, None, None, None) representing a side itself constituting an input graph with an indefinite attribute as an attribute in Processing (3) performed by the graph-with-attribute generation unit 140.

As shown in FIG. 13, the graph-with-attribute generation unit 140 converts a side constituting the graph with an indefinite attribute shown in FIG. 20 into a vertex of a graph with an attribute.

Figure 14:
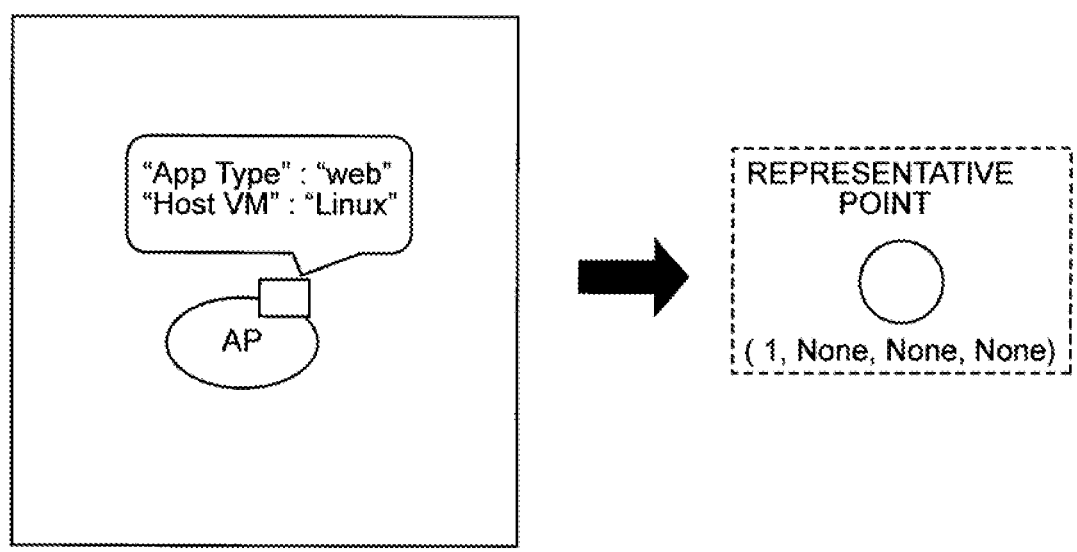
FIG. 14 is an explanatory diagram showing an example of processing of the graph-with-attribute generation unit converting a vertex constituting a graph with an indefinite attribute into a representative point.

FIG. 14 is an explanatory diagram showing an example of processing of the graph-with-attribute generation unit 140 converting a vertex constituting a graph with an indefinite attribute into a representative point. FIG. 14 shows processing of generating a vertex (i.e., representative point) including a tuple (1, None, None, None) representing a vertex itself constituting an input graph with an indefinite attribute as an attribute in Processing (3) performed by the graph-with-attribute generation unit 140.

As shown in FIG. 14, the graph-with-attribute generation unit 140 converts the vertex AP constituting the graph with an indefinite attribute shown in FIG. 20 into a vertex of a graph with an attribute.

An element constituting an attribute of a vertex representing a vertex itself and a side itself constituting a graph with an indefinite attribute generated by the graph-with-attribute generation unit 140 in Processing (3) is not required to be written only by "None" and "1". The element constituting an attribute may be written in, for example, another character string and number.

The graph-with-attribute generation unit 140 gives an identifier to each representative point in the process of converting a vertex and a side into a representative point in Processing (3). The identifier enables a vertex and a side of a conversion source to be identified. The identifier given to each representative point may adopt any format as long as a vertex and a side of a conversion source of a representative point can be identified by the identifier.

Figure 15:
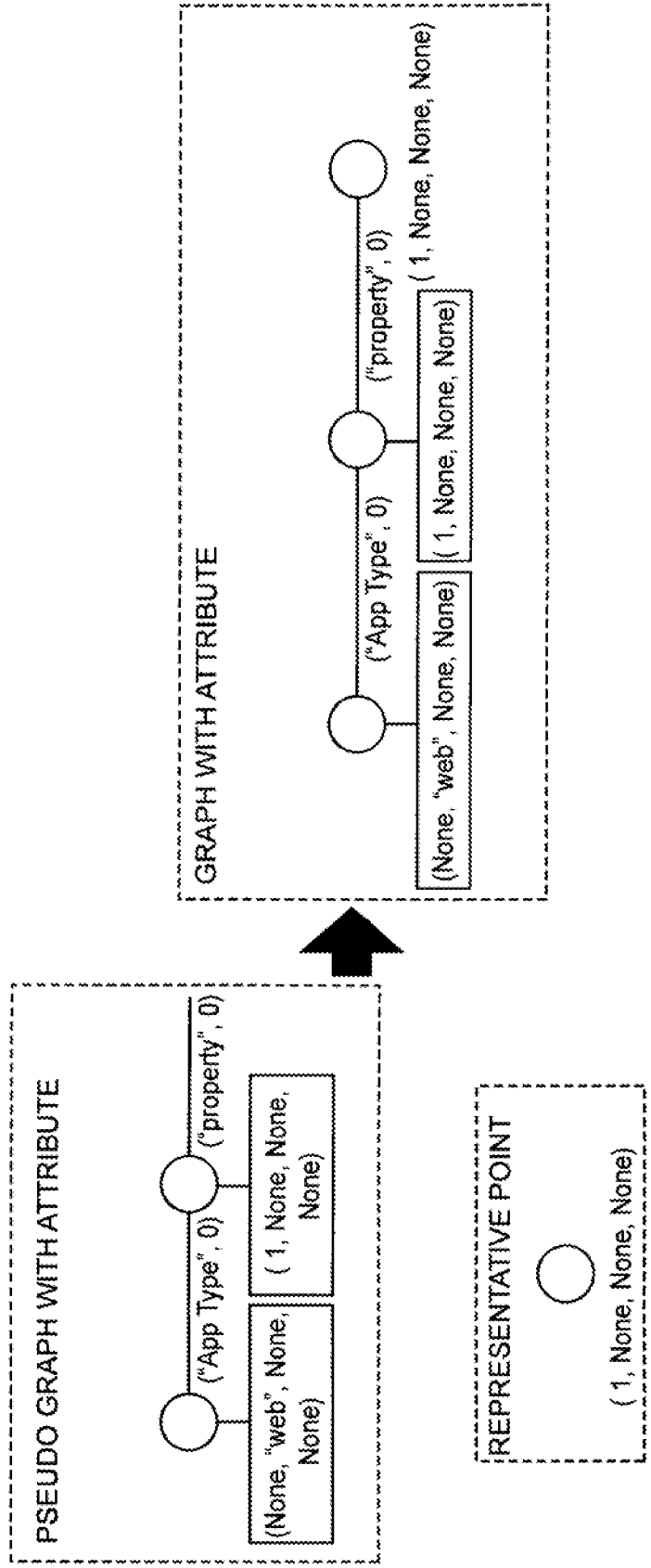
FIG. 15 is an explanatory diagram showing an example of processing of the graph-with-attribute generation unit linking a representative point to a pseudo graph with an attribute.

FIG. 15 is an explanatory diagram showing an example of processing of the graph-with-attribute generation unit 140 linking a representative point to a pseudo graph with an attribute. FIG. 15 shows processing of the graph-with-attribute generation unit 140, in Processing (3), linking a representative point of the vertex AP of an input graph with an indefinite attribute and a pseudo graph with an attribute obtained in Processing (2).

In Processing (3), the graph-with-attribute generation unit 140 recognizes, on the basis of an identifier of a pseudo graph with an attribute obtained in Processing (2) shown in FIG. 12 and an identifier of a representative point, the pseudo graph with an attribute and the representative point are obtained from the same vertex of an input graph with an indefinite attribute.

The graph-with-attribute generation unit 140 gives a representative point of the vertex AP as one of end points of sides constituting a pseudo graph with an attribute and including ("property", 0) as an attribute. That is, the graph-with-attribute generation unit 140 converts a vertex itself into a part of a graph with an attribute.

FIG. 15 shows one example of conversion processing of the graph-with-attribute generation unit 140 performed on a vertex constituting an input graph with an indefinite attribute and having a specific format. The graph-with-attribute generation unit 140 performs similar conversion processing on each of representative points of all vertices and sides constituting an input graph with an indefinite attribute. Two or more pseudo graphs may be given to each representative point.

Figure 16:
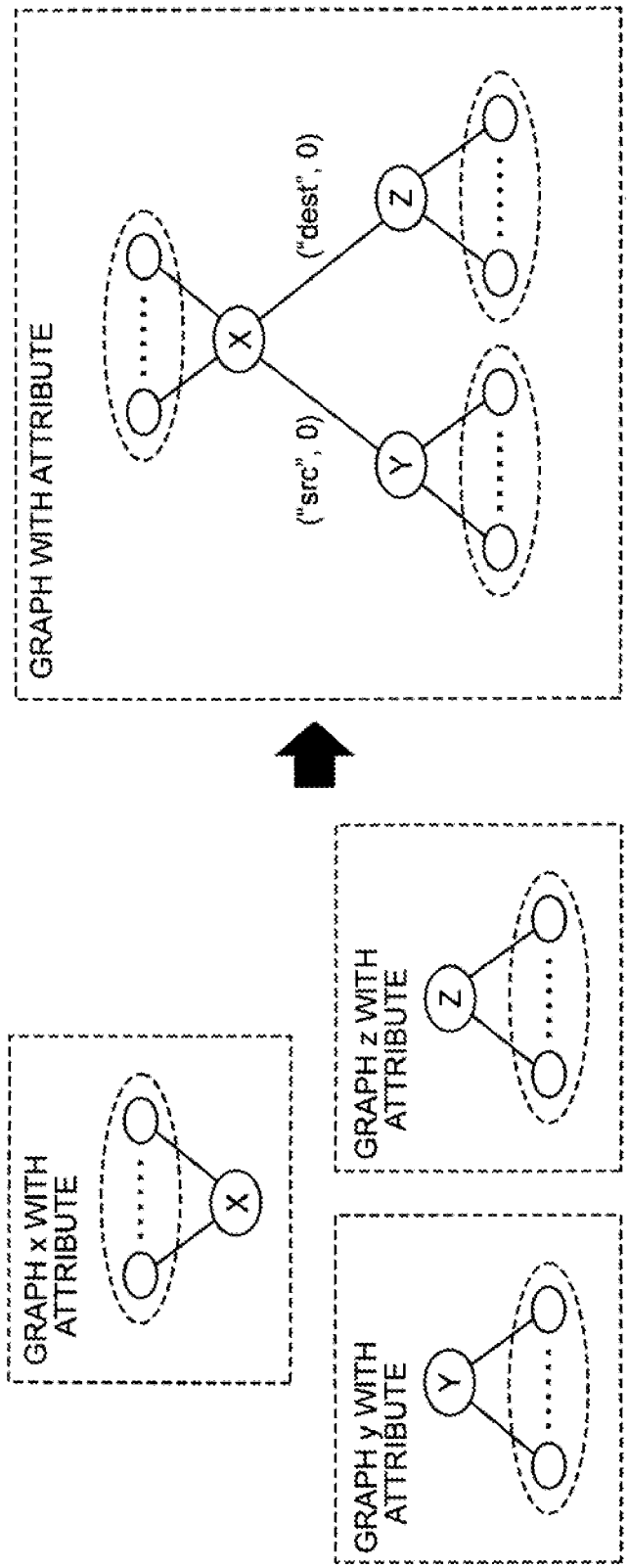
FIG. 16 is an explanatory diagram showing an example of processing of the graph-with-attribute generation unit adding a side between representative points of a graph with an attribute.

FIG. 16 is an explanatory diagram showing an example of processing of the graph-with-attribute generation unit 140 adding a side between representative points of a graph with an attribute. FIG. 16 shows processing of the graph-with-attribute generation unit 140, in Processing (3), adding a side between graphs with an attribute in accordance with the graph topology of an input graph with an indefinite attribute. The graphs with an attribute are obtained by linking representative points of each vertex and each side of the input graph with an indefinite attribute.

A graph x with an attribute, a graph y with an attribute, and a graph z with an attribute shown in FIG. 16 are obtained by the graph-with-attribute generation unit 140 linking each representative point to a pseudo graph with an attribute obtained in Processing (2). The graph x with an attribute, the graph y with an attribute, and a graph z with an attribute are respectively obtained from the side, the vertex AP, and the vertex VM shown in FIG. 20.

An ellipse in each graph with an attribute shown in FIG. 16 represents a vertex. A line segment in each graph with an attribute represents a side. A vertex X, a vertex Y, and a vertex Z shown in FIG. 16 respectively correspond to a representative point of a side, a representative point of the vertex AP, and a representative point of the vertex VM shown in FIG. 20.

In Processing (3), the graph-with-attribute generation unit 140 reads each of identifiers of a side, the vertex AP corresponding to the starting point of the side, and the vertex VM corresponding to the end point of the side of the input graph with an indefinite attribute.

The graph-with-attribute generation unit 140 adds a side including an attribute ("src", 0) between a representative point X and a representative point Y. The representative point X has the same identifier as the identifier of the side. The representative point Y has the same identifier as the identifier of the starting point (vertex AP).

The graph-with-attribute generation unit 140 adds a side including an attribute ("dest", 0) between the representative point X and a representative point Z. The representative point Z has the same identifier as the identifier of the end point (vertex VM). The graph-with-attribute generation unit 140 generates a graph with an attribute shown in FIG. 16 by adding each side. Note that "src" and "dest" are abbreviations of "source" and "destination", respectively.

An element constituting an attribute between representative points generated by the graph-with-attribute generation unit 140 in Processing (3) is not required to be expressed by, for example, "src", "dest", and "0". An element constituting an attribute between representative points is not required to be expressed by character strings such as "src" and "dest" or "0" as long as information on a starting point and information on an end point can be distinguished.

After generating a graph with an attribute, the graph-with-attribute generation unit 140 inputs the generated graph with an attribute to the output device 300.

As described above, the graph-with-indefinite-attribute conversion device 100 of the exemplary embodiment converts an input graph with an indefinite attribute into a graph with an attribute. The graph-with-indefinite-attribute conversion device 100 includes the indefinite attribute identification unit 110. The indefinite attribute identification unit 110 identifies an attribute name of an attribute and an attribute value of the attribute of a vertex and a side constituting a graph with an indefinite attribute.

The graph-with-indefinite-attribute conversion device 100 includes the attribute name conversion unit 120. The attribute name conversion unit 120 converts the identified attribute name into a side constituting a graph with an attribute and an attribute of the side. The attribute is composed of a first predetermined number of types of elements arranged in a first predetermined order. For example, each attribute name conversion tuple shown in FIG. 6 corresponds to an attribute composed of two types of elements arranged in the first predetermined order.

The graph-with-indefinite-attribute conversion device 100 includes the attribute value conversion unit 130. The attribute value conversion unit 130 converts an identified attribute value into a vertex constituting a graph with an attribute and an attribute of the vertex. The attribute is composed of a second predetermined number of types of elements arranged in a second predetermined order. For example, each attribute value conversion tuple shown in FIG. 9 corresponds to an attribute composed of four types of elements arranged in the second predetermined order.

The second predetermined number may be the same as the first predetermined number. The second predetermined order may be the same as the first predetermined order.

The graph-with-indefinite-attribute conversion device 100 includes the graph-with-attribute generation unit 140.

The graph-with-attribute generation unit 140 generates a graph with an attribute by combining the converted side and an attribute of the side and the converted vertex and an attribute of the vertex on the basis of the graph topology of a graph with an indefinite attribute.

For example, the indefinite attribute identification unit 110 may identify information indicating the graph topology of a graph with an indefinite attribute. The graph-with-attribute generation unit 140 may generate a graph with an attribute by using the identified information indicating the graph topology.

When the graph with an indefinite attribute is processed as a graph-with-attribute calculator, the graph-with-indefinite-attribute conversion device 100 can input the converted graph with an attribute to the output device 300 as the graph-with-attribute calculator.

When the attribute value of a vertex or a side of a graph with an indefinite attribute is required to have a predetermined format at the time of processing as the graph calculator, the graph-with-indefinite-attribute conversion device 100 is only required to adjust the format of the attribute value such that the attribute value follows the required format by using, for example, an existing conversion device.

[Description of Operation]

Figure 17:
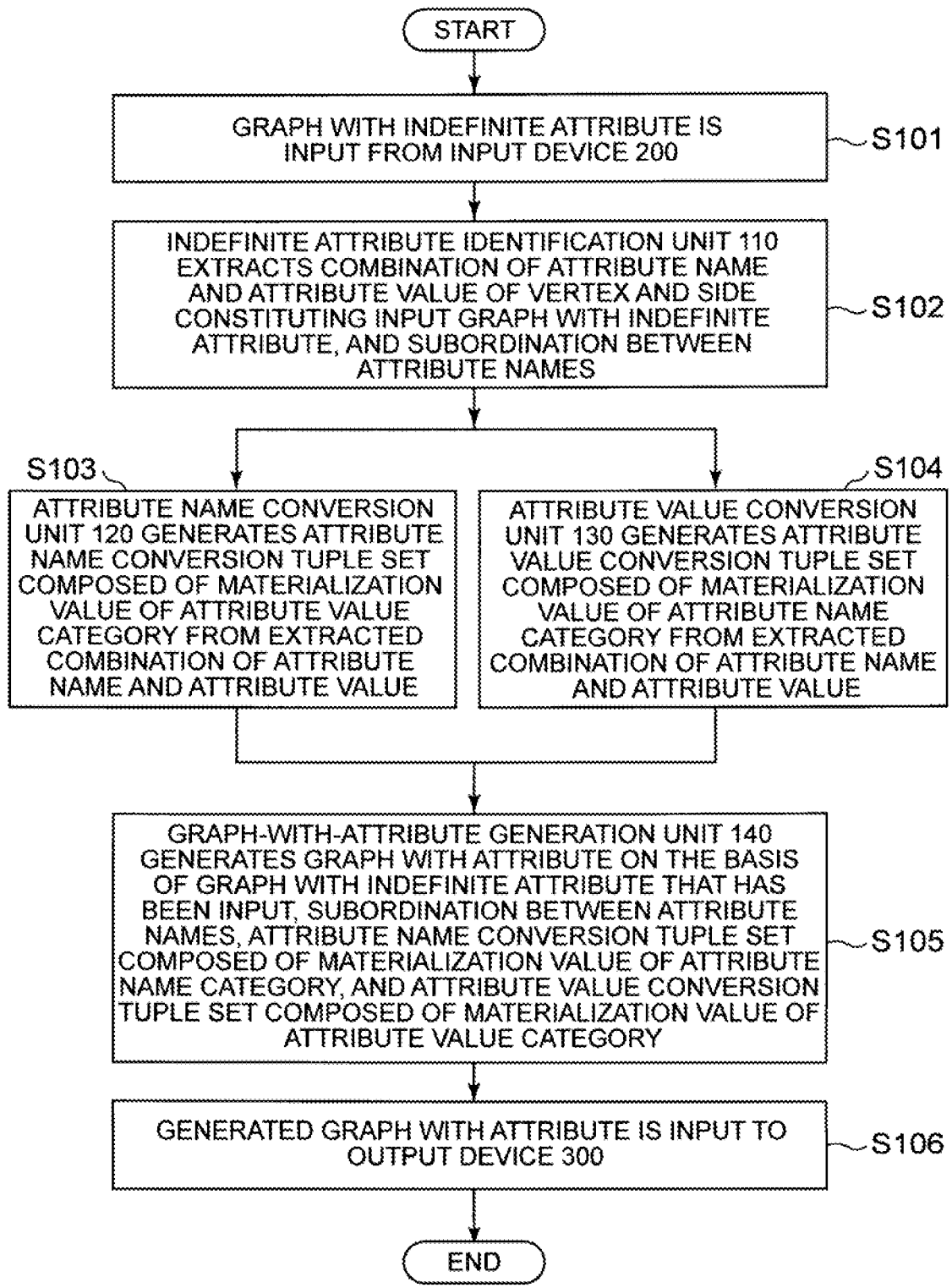
FIG. 17 is a flowchart showing the operation in graph-with-indefinite-attribute conversion processing performed by a graph-with-indefinite-attribute conversion device of the exemplary embodiment.

The operation of the graph-with-indefinite-attribute conversion device 100 of the exemplary embodiment will be described below with reference to FIG. 17. FIG. 17 is a flowchart showing the operation in graph-with-indefinite-attribute conversion processing performed by the graph-with-indefinite-attribute conversion device 100 of the exemplary embodiment.

FIG. 17 is a flowchart showing the operation in processing of converting an input graph with an indefinite attribute into a graph with an attribute. In the following description, the matters already described will be appropriately omitted.

First, a graph with an indefinite attribute is input from the input device 200 to the graph-with-indefinite-attribute conversion device 100 (Step S101). The indefinite attribute identification unit 110 and the graph-with-attribute generation unit 140 receive the input graph with an indefinite attribute.

The indefinite attribute identification unit 110 extracts a combination composed of an attribute name and an attribute value of a vertex and a side constituting the graph with an indefinite attribute that has been input in Step S101 from the input graph with an indefinite attribute as an extracted tuple.

The indefinite attribute identification unit 110 extracts the subordination between attribute names from the input graph with an indefinite attribute (Step S102). The indefinite attribute identification unit 110 inputs an extracted tuple set to the attribute name conversion unit 120 and the attribute value conversion unit 130. The indefinite attribute identification unit 110 inputs the extracted subordination set to the graph-with-attribute generation unit 140.

The attribute name conversion unit 120 generates an attribute name conversion tuple set from an extracted tuple set (Step S103). The attribute name conversion tuple set is a set of attribute name conversion tuples composed of a materialization value of an attribute name category. The extracted tuple set is a set of combinations composed of the input attribute name and attribute value. The attribute name conversion unit 120 inputs the generated attribute name conversion tuple set to the graph-with-attribute generation unit 140.

At the same time as the processing of Step S103, the attribute value conversion unit 130 generates an attribute value conversion tuple set from an extracted tuple set (Step S104). The attribute value conversion tuple set is a set of attribute value conversion tuples composed of a materialization value of an attribute value category. The extracted tuple set is a set of combinations composed of the input attribute name and attribute value. The attribute value conversion unit 130 inputs the generated attribute value conversion tuple set to the graph-with-attribute generation unit 140.

The graph-with-attribute generation unit 140 generates a graph with an attribute on the basis of the graph with an indefinite attribute that has been input in Step S101, the subordination between attribute names that has been extracted in Step S102, the attribute name conversion tuple set that has been generated in Step S103, and the attribute value conversion tuple set that has been generated in Step S104 (Step S105).

After generating a graph with an attribute, the graph-with-attribute generation unit 140 inputs the generated graph with an attribute to the output device 300 (Step S106). After the input, the graph-with-indefinite-attribute conversion device 100 ends the graph-with-indefinite-attribute conversion processing.

Description of Effects

The graph-with-indefinite-attribute conversion device 100 of the exemplary embodiment converts an input graph with an indefinite attribute to a graph with an attribute in which a vertex and a side include an attribute name and an attribute value of a vertex and a side constituting the graph with an indefinite attribute.

The graph-with-indefinite-attribute conversion device 100 includes the indefinite attribute identification unit 110. The indefinite attribute identification unit 110 extracts one or more attribute names and one or more attribute values of one or more vertices or one or more sides of the input graph with an indefinite attribute.

The graph-with-indefinite-attribute conversion device 100 includes the attribute name conversion unit 120. The attribute name conversion unit 120 converts an attribute name of the extracted vertex or side into a side of the graph with an attribute and an attribute of the side in a predetermined format. The graph-with-indefinite-attribute conversion device 100 includes the attribute value conversion unit 130. The attribute value conversion unit 130 converts an attribute value of the extracted vertex or side into a vertex of the graph with an attribute and an attribute of the vertex in a predetermined format.

The graph-with-indefinite-attribute conversion device 100 includes the graph-with-attribute generation unit 140 that generates a graph with an attribute. The graph-with-attribute generation unit 140 extracts predetermined information related to topology from the graph topology of the input graph with an indefinite attribute, and combines a converted side and a predetermined attribute of the side and a converted vertex and a predetermined attribute of the vertex in accordance with the extracted predetermined information. The graph-with-attribute generation unit 140 thereby generates a graph with an attribute.

The above-described configuration enables the graph-with-indefinite-attribute conversion device 100 to convert the graph with an indefinite attribute into the graph with an attribute such that each of a vertex and a side of the graph has a vector whose dimension is fixed.

An N-th (N is an integer of $1 \leq N \leq M$) element of an M-dimensional (M is a natural number) vector of a vertex of the converted graph with an attribute has an attribute name common to all vertices. Similarly, a K-th (K is an integer of $1 \leq K \leq L$) element of an L-dimensional (L is a natural number) vector of a side of the converted graph with an attribute has an attribute name common to all sides.

This is because the attribute name conversion unit 120 converts the attribute name of the input graph with an indefinite attribute into a tuple that has a materialization value of a predefined attribute name category as an element and has a stipulated length (M in the above-described example).

Similarly, the attribute value conversion unit 130 converts the attribute value of the input graph with an indefinite attribute into a tuple that has a materialization value of a predefined attribute value category as an element and has a stipulated length (L in the above-described example).

The graph-with-indefinite-attribute conversion device 100 of the exemplary embodiment can convert a graph with an indefinite attribute into a graph with an attribute. A user of the graph-with-indefinite-attribute conversion device 100 can make a learning device represented by a graph neural network learn a graph with an indefinite attribute.

When the graph neural network requires the attribute value of a vertex or a side of a graph with an attribute to have a predetermined format, the user is required to adjust the format of the attribute value of the vertex or side of the converted graph with an attribute such that the attribute value follows the required format by using, for example, an existing conversion device.

Even when the graph neural network learns a graph with an indefinite attribute in which the attribute name of the graph is frequently changed, the attribute name itself of the graph with an indefinite attribute is treated as one element of an attribute value of the converted graph with an attribute in the converted graph with an attribute. Effects of change of the attribute name of the graph with an indefinite attribute is reduced, and thus the labor for re-learning of the graph neural network is reduced.

Figure 18:
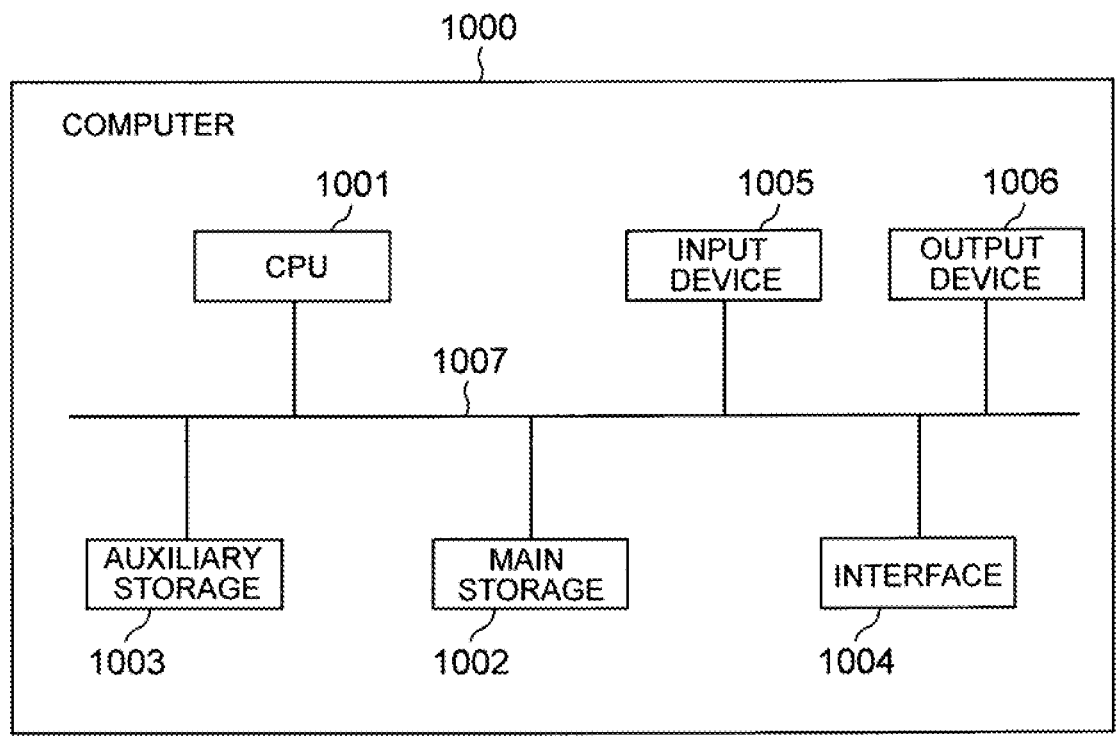
FIG. 18 is a schematic block diagram showing an example of the configuration of a computer according to the exemplary embodiment of the invention.

FIG. 18 is a schematic block diagram showing an example of the configuration of a computer according to the exemplary embodiment of the invention. A computer 1000 includes a CPU 1001, a main storage 1002, an auxiliary storage 1003, an interface 1004, an input device 1005, and an output device 1006.

The graph-with-indefinite-attribute conversion device 100 of the exemplary embodiment of the invention is mounted in the computer 1000. The operation of the graph-with-indefinite-attribute conversion device 100 is stored in the auxiliary storage 1003 in the form of a graph-with-indefinite attribute conversion program. The CPU 1001 reads the graph-with-indefinite attribute conversion program from the auxiliary storage 1003, and expands the program in the main storage 1002. The CPU 1001 performs processing described in the above-described exemplary embodiment in accordance with the graph-with-indefinite attribute conversion program.

That is, the indefinite attribute identification unit 110, the attribute name conversion unit 120, the attribute value conversion unit 130, and the graph-with-attribute generation unit 140 shown in FIG. 1 are implemented by the CPU 1001 that operates in accordance with the graph-with-indefinite attribute conversion program.

The main storage 1002 is used as a data work area and a temporary data saving area. The main storage 1002 is, for example, a random access memory (RAM).

The auxiliary storage 1003 is an example of non-transitory tangible media. Other examples of the non-temporary tangible media include, for example, a magnetic disk, a magneto-optical disk, a compact disk read only memory (CD-ROM), a digital versatile disk read only memory (DVD-ROM), and a semiconductor memory, which are connected via the interface 1004. When the program is delivered to the computer 1000 over a communication line, the computer 1000, which has received the delivery, may expand the program in the main storage 1002, and perform the above-described processing.

The input device 1005 has a function of inputting data and a processing instruction. The input device 1005 is, for example, a keyboard or a mouse.

The output device 1006 has a function of outputting data. For example, the output device 1006 is a display device such as a liquid crystal display device or a printing device such as a printer.

As shown in FIG. 18, each component is connected to a system bus 1007 in the computer 1000.

The graph-with-indefinite-attribute conversion device 100 may be implemented by a system in which two or more physically separated devices are connected by wire or wirelessly instead of a single device.

Part or all of each component may be implemented by general-purpose or dedicated circuitry, a processor, or a combination thereof. These may be configured by a single chip, or may be configured by a plurality of chips connected via a bus. Part or all of each component may be implemented by a combination of, for example, the above-described circuitry and a program.

When part or all of each component is implemented by, for example, a plurality of information processing devices or circuitry, the plurality of information processing devices or circuitry may be centrally disposed or decentrally disposed. For example, the information processing device and the circuitry may be implemented in a form in which, such as a client-and-server system and a cloud computing system, the components are connected via a communication network.

Figure 19:
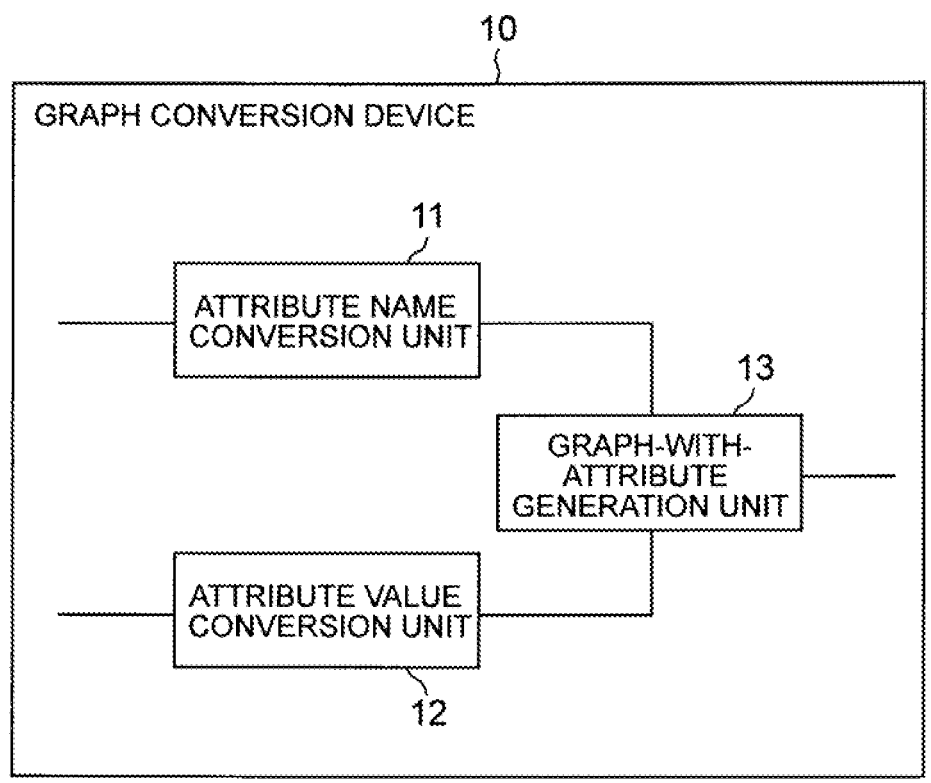
FIG. 19 is a block diagram outlining a graph conversion device according to the invention.

The invention will now be outlined. FIG. 19 is a block diagram outlining a graph conversion device according to the invention. A graph conversion device 10 according to the invention converts an input first graph with an attribute (e.g., graph with an indefinite attribute) into a second graph with an attribute (e.g., graph with an attribute), and includes: an attribute name conversion unit 11 (e.g., attribute name conversion unit 120) which converts an attribute name of an attribute of each of a vertex and a side constituting the first graph with an attribute into a side constituting the second graph with an attribute and an attribute of the side, the attribute being composed of a first predetermined number of types of elements arranged in a first predetermined order; an attribute value conversion unit 12 (e.g., attribute value conversion unit 130) which converts an attribute value of an attribute of each of a vertex and a side constituting the first graph with an attribute into a vertex constituting the second graph with an attribute and an attribute of the vertex, the attribute being composed of a second predetermined number of types of elements arranged in a second predetermined order; and a graph-with-attribute generation unit 13 (e.g., graph-with-attribute generation unit 140) which generates the second graph with an attribute by combining a converted side and an attribute of the side and a converted vertex and an attribute of the vertex on the basis of graph topology of the first graph with an attribute.

Such configuration enables the graph conversion device to convert a graph with an indefinite attribute into a graph with an attribute.

The graph conversion device 10 may include an attribute identification unit (e.g., indefinite attribute identification unit 110) which identifies an attribute name of an attribute and an attribute value of the attribute of each of a vertex and a side constituting a first graph with an attribute. An attribute name conversion unit 11 may convert the identified attribute name. An attribute value conversion unit 12 may convert the identified attribute value.

Such configuration enables the graph conversion device to extract an attribute of each of a vertex and a side constituting a graph with an indefinite attribute.

The first predetermined number of types of elements may be configured by a value indicating an attribute name category to which the identified attribute name belongs. The first predetermined number of types of elements may include the identified attribute name.

Such configuration enables the graph conversion device to determine the attribute of the graph with an attribute in accordance with the attribute name category to which an attribute name extracted from the graph with an indefinite attribute belongs.

The attribute name conversion unit 11 may uniquely allocate an attribute name category to the identified attribute name with reference to a predefined rule for allocating an attribute name category, and convert the attribute name on the basis of the allocated attribute name category.

Such configuration enables the graph conversion device to generate an attribute of a graph with an attribute in accordance with an attribute name category.

The second predetermined number of types of elements may be configured by a value indicating an attribute value category to which the identified attribute value belongs. The second predetermined number of types of elements may include the identified attribute value.

Such configuration enables the graph conversion device to determine the attribute of the graph with an attribute in accordance with the attribute value category to which an attribute value extracted from the graph with an indefinite attribute belongs.

The attribute value conversion unit 12 may uniquely allocate an attribute value category to the identified attribute value with reference to a predefined rule for allocating an attribute value category, and convert the attribute value on the basis of the allocated attribute value category.

Such configuration enables the graph conversion device to generate an attribute of a graph with an attribute in accordance with an attribute value category.

A part or all of the above-described exemplary embodiment can be described as in the following supplementary notes, but are not limited thereto.

(Supplementary note 1) A graph conversion device that converts a first graph with an attribute into a second graph with an attribute, including: an attribute name conversion unit which converts an attribute name of an attribute of each of a vertex and a side constituting the first graph with an attribute into a side constituting the second graph with an attribute and an attribute of the side, the attribute being composed of a first predetermined number of types of elements arranged in a first predetermined order; an attribute value conversion unit which converts an attribute value of an attribute of each of a vertex and a side constituting the first graph with an attribute into a vertex constituting the second graph with an attribute and an attribute of the vertex, the attribute being composed of a second predetermined number of types of elements arranged in a second predetermined order; and a graph-with-attribute generation unit which generates the second graph with an attribute by combining a converted side and an attribute of the side and a converted vertex and an attribute of the vertex on the basis of graph topology of the first graph with an attribute.

(Supplementary note 2) The graph conversion device according to Supplementary note 1, further including an attribute identification unit which identifies an attribute name of an attribute and an attribute value of the attribute of each of a vertex and a side constituting the first graph with an attribute, wherein the attribute name conversion unit converts the identified attribute name, and the attribute value conversion unit converts the identified attribute value.

(Supplementary note 3) The graph conversion device according to Supplementary note 2, in which a first predetermined number of types of elements is configured by a value indicating an attribute name category to which the identified attribute name belongs.

(Supplementary note 4) The graph conversion device according to Supplementary note 3, in which a first predetermined number of types of elements includes the identified attribute name.

(Supplementary note 5) The graph conversion device according to Supplementary note 3 or 4, in which the attribute name conversion unit: uniquely allocates an attribute name category to the identified attribute name with reference to a predefined rule for allocating an attribute name category; and converts the attribute name on the basis of the allocated attribute name category.

(Supplementary note 6) The graph conversion device according to any one of Supplementary notes 3 to 5, in which an attribute name category represents a name of a set to which an attribute name belongs.

(Supplementary note 7) The graph conversion device according to any one of Supplementary notes 2 to 6, in which a second predetermined number of types of elements is configured by a value indicating an attribute value category to which the identified attribute value belongs.

(Supplementary note 8) The graph conversion device according to Supplementary note 7, in which a second predetermined number of types of elements includes the identified attribute value.

(supplementary note 9) The graph conversion device according to Supplementary note 7 or 8, in which the attribute value conversion unit: uniquely allocates an attribute value category to the identified attribute value with reference to a predefined rule for allocating an attribute value category; and converts the attribute value on the basis of the allocated attribute value category.

(Supplementary note 10) The graph conversion device according to any one of Supplementary notes 7 to 9, in which an attribute value category represents a name of a set to which an attribute value belongs.

(Supplementary note 11) The graph conversion device according to any one of Supplementary notes 2 to 10, in which the attribute identification unit identifies information indicating graph topology of the first graph with an attribute, and the graph-with-attribute generation unit generates the second graph with an attribute by using the identified information indicating graph topology.

(Supplementary note 12) The graph conversion device according to any one of Supplementary notes 2 to 11, in which the attribute identification unit identifies predetermined subordination between attribute names of attributes of a vertex and a side constituting the first graph with an attribute, and when a first attribute name is a superordinate-conceptual attribute name of a second attribute name identified from a same vertex, the predetermined subordination is relation in which the second attribute name depends on the first attribute name.

(Supplementary note 13) The graph conversion device according to Supplementary note 12, in which the graph-with-attribute generation unit: generates a pseudo graph by combining a converted side and a converted vertex in accordance with the identified predetermined subordination; gives an attribute obtained by the attribute value conversion unit as an attribute of a vertex constituting the generated pseudo graph; and gives an attribute obtained by the attribute name conversion unit as an attribute of a side constituting the generated pseudo graph.

(Supplementary note 14) The graph conversion device according to Supplementary note 13, in which the graph-with-attribute generation unit: generates a vertex including, as an attribute, a tuple representing a side belonging to a domain of graph topology of the first graph with an attribute and vertex including, as an attribute, a tuple representing a vertex belonging to a vertex set of the first graph with an attribute; gives the generated vertex to a pseudo graph to which an attribute is given; and generates a side including, as an attribute, a tuple in which a value indicating an attribute name category is an element between a vertex including, as an attribute, a tuple representing a side belonging to the domain and a vertex including, as an attribute, a tuple representing a vertex that corresponds to a starting point or an end point of the side and belongs to the vertex set.

(Supplementary note 15) A graph conversion method executed in a graph conversion device that converts a first graph with an attribute into a second graph with an attribute, comprising: converting an attribute name of an attribute of each of a vertex and a side constituting the first graph with an attribute into a side constituting the second graph with an attribute and an attribute of the side, the attribute being composed of a first predetermined number of types of elements arranged in a first predetermined order; converting an attribute value of an attribute of each of a vertex and a side constituting the first graph with an attribute into a vertex constituting the second graph with an attribute and an attribute of the vertex, the attribute being composed of a second predetermined number of types of elements arranged in a second predetermined order; and generating the second graph with an attribute by combining a converted side and an attribute of the side and a converted vertex and an attribute of the vertex on the basis of graph topology of the first graph with an attribute.

(Supplementary note 16) A graph conversion program causing a computer to perform: attribute name conversion processing of converting an attribute name of an attribute of each of a vertex and a side constituting a first graph with an attribute to be converted into a second graph with an attribute into a side constituting the second graph with an attribute and an attribute of the side, the attribute being composed of a first predetermined number of types of elements arranged in a first predetermined order; attribute value conversion processing of converting an attribute value of an attribute of each of a vertex and a side constituting the first graph with an attribute into a vertex constituting the second graph with an attribute and an attribute of the vertex, the attribute being composed of a second predetermined number of types of elements arranged in a second predetermined order; and graph-with-attribute generation processing of generating the second graph with an attribute by combining a converted side and an attribute of the side and a converted vertex and an attribute of the vertex on the basis of graph topology of the first graph with an attribute.

While the invention has been particularly shown and described with reference to exemplary embodiments thereof, the invention is not limited to these embodiment. It will be understood by those of ordinary skill in the art that various changes in form and details may be made therein without departing from the spirit and scope of the present invention as defined by the claims.

What is claimed is:

1. A graph conversion device that converts a first graph with attributes into a second graph with attributes, comprising:
    an attribute name conversion unit which converts an attribute name of an attribute of each of a vertex and a side constituting the first graph with attributes into a converted side constituting the second graph with attributes and a side-attribute of the side, the side-attribute being composed of a first predetermined number of types of elements arranged in a first predetermined order;
    an attribute value conversion unit which converts an attribute value of the attribute of each of the vertex and the side constituting the first graph with attributes into a converted vertex constituting the second graph with attributes and a vertex-attribute of the vertex, the vertex-attribute being composed of a second predetermined number of types of elements arranged in a second predetermined order; and
    a graph-with-attribute generation unit which generates the second graph with attributes by combining the converted side and the side-attribute of the side and the converted vertex and the vertex-attribute of the vertex on the basis of graph topology of the first graph with attributes.

2. The graph conversion device according to claim 1, further comprising an attribute identification unit which identifies the attribute name and the attribute value of the attribute of each of the vertex and the side constituting the first graph with attributes,
    wherein the attribute name conversion unit converts the identified attribute name, and
    the attribute value conversion unit converts the identified attribute value.

3. The graph conversion device according to claim 2, wherein the first predetermined number of types of elements is configured by a value indicating an attribute name category to which the identified attribute name belongs.

4. The graph conversion device according to claim 3, wherein the first predetermined number of types of elements includes the identified attribute name.

5. The graph conversion device according to claim 3, wherein the attribute name conversion unit:
    uniquely allocates the attribute name category to the identified attribute name with reference to a predefined rule for allocating an attribute name category; and
    converts the attribute name on the basis of the allocated attribute name category.

6. The graph conversion device according to claim 4, wherein the attribute name conversion unit:
    uniquely allocates the attribute name category to the identified attribute name with reference to a predefined rule for allocating an attribute name category; and
    converts the attribute name on the basis of the allocated attribute name category.

7. The graph conversion device according to claim 3, wherein the attribute name category represents a name of a set to which the identified attribute name belongs.

8. The graph conversion device according to claim 4, wherein the attribute name category represents a name of a set to which the identified attribute name belongs.

9. The graph conversion device according to claim 5, wherein the attribute name category represents a name of a set to which the identified attribute name belongs.

10. The graph conversion device according to claim 6, wherein the attribute name category represents a name of a set to which the identified attribute name belongs.

11. The graph conversion device according to claim 2, wherein the second predetermined number of types of elements is configured by a value indicating an attribute value category to which the identified attribute value belongs.

12. The graph conversion device according to claim 11, wherein the second predetermined number of types of elements includes the identified attribute value.

13. The graph conversion device according to claim 11, wherein the attribute value conversion unit:
uniquely allocates the attribute value category to the identified attribute value with reference to a predefined rule for allocating an attribute value category; and
converts the attribute value on the basis of the allocated attribute value category.

14. The graph conversion device according to claim 11, wherein the attribute value category represents a name of a set to which an attribute value belongs.

15. The graph conversion device according to claim 2, wherein the attribute identification unit identifies information indicating graph topology of the first graph with attributes, and
the graph-with-attribute generation unit generates the second graph with attributes by using the identified information indicating graph topology.

16. The graph conversion device according to claim 2, wherein the attribute identification unit identifies predetermined subordination between attribute names of attributes of a vertex and a side constituting the first graph with attributes, and
when a first attribute name is a superordinate-conceptual attribute name of a second attribute name identified from a same vertex, the predetermined subordination is a relation in which the second attribute name depends on the first attribute name.

17. The graph conversion device according to claim 16, wherein the graph-with-attribute generation unit:
generates a pseudo graph by combining the converted side and the converted vertex in accordance with the identified predetermined subordination;
gives the side-attribute obtained by the attribute value conversion unit as an attribute of a vertex constituting the generated pseudo graph; and
gives the vertex-attribute obtained by the attribute name conversion unit as an attribute of a side constituting the generated pseudo graph.

18. The graph conversion device according to claim 17, wherein the graph-with-attribute generation unit:
generates a vertex including, as an attribute, a tuple representing a side belonging to a domain of graph topology of the first graph with attributes and vertex including, as an attribute, a tuple representing a vertex belonging to a vertex set of the first graph with attributes;
gives the generated vertex to a pseudo graph to which an attribute is given; and
generates a side including, as an attribute, a tuple in which a value indicating an attribute name category is an element between a vertex including, as an attribute, a tuple representing a side belonging to the domain and a vertex including, as an attribute, a tuple representing a vertex that corresponds to a starting point or an end point of the side and belongs to the vertex set.

19. A graph conversion method executed in a graph conversion device that converts a first graph with attributes into a second graph with attributes, comprising:
converting an attribute name of an attribute of each of a vertex and a side constituting the first graph with attributes into a converted side constituting the second graph with attributes and a side-attribute of the side, the side-attribute being composed of a first predetermined number of types of elements arranged in a first predetermined order;
converting an attribute value of the attribute of each of the vertex and the side constituting the first graph with attributes into a converted vertex constituting the second graph with attributes and a vertex-attribute of the vertex, the vertex-attribute being composed of a second predetermined number of types of elements arranged in a second predetermined order; and
generating the second graph with attributes by combining the converted side and the side-attribute of the side and the converted vertex and the vertex-attribute of the vertex on the basis of graph topology of the first graph with attributes.

20. A non-transitory computer readable recording medium storing a graph conversion program causing a computer to:
convert an attribute name of an attribute of each of a vertex and a side constituting a first graph with attributes to be converted into a second graph with attributes into a converted side constituting the second graph with attributes and a side-attribute of the side, the side-attribute being composed of a first predetermined number of types of elements arranged in a first predetermined order;
convert an attribute value of the attribute of each of the vertex and the side constituting the first graph with attributes into a converted vertex constituting the second graph with attributes and a vertex-attribute of the vertex, the vertex-attribute being composed of a second predetermined number of types of elements arranged in a second predetermined order; and
generate the second graph with attributes by combining the converted side and the side-attribute of the side and the converted vertex and the vertex-attribute of the vertex on the basis of graph topology of the first graph with attributes.

* * * * *